US007676658B2

(12) United States Patent
Yanagawa et al.

(10) Patent No.: US 7,676,658 B2
(45) Date of Patent: Mar. 9, 2010

(54) DATA PROCESSING APPARATUS CONFIGURED TO LOAD A PROGRAM CORRESPONDING TO EACH OF A PLURALITY OF FUNCTIONS INTO A MEMORY AND EXECUTE THE LOADED PROGRAM, AND METHOD FOR LOADING PROGRAMS IN THE DATA PROCESSING APPARATUS

(75) Inventors: Katsuhiko Yanagawa, Inagi (JP); Toshihisa Okutsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 11/684,905

(22) Filed: Mar. 12, 2007

(65) Prior Publication Data

US 2007/0220501 A1   Sep. 20, 2007

(30) Foreign Application Priority Data

Mar. 15, 2006   (JP)   ............................. 2006-070564

(51) Int. Cl.
*G06F 1/00* (2006.01)
(52) U.S. Cl. .................. 712/220; 713/323; 713/310
(58) Field of Classification Search ................. 712/220; 717/169; 713/323, 310
See application file for complete search history.

(56) References Cited

U.S. PATENT DOCUMENTS

| | | | | |
|---|---|---|---|---|
| 6,453,423 | B1 * | 9/2002 | Loison | ........................ 713/310 |
| 2003/0137684 | A1 * | 7/2003 | Osada | ........................ 358/1.13 |
| 2003/0218769 | A1 * | 11/2003 | Otsuka | ........................ 358/1.14 |
| 2004/0027601 | A1 * | 2/2004 | Ito et al. | ..................... 358/1.13 |
| 2004/0075622 | A1 * | 4/2004 | Shiuan et al. | ................. 345/1.1 |
| 2004/0205261 | A1 * | 10/2004 | Osada | ........................... 710/8 |
| 2004/0233468 | A1 * | 11/2004 | Ibaraki et al. | ............... 358/1.13 |
| 2005/0050371 | A1 * | 3/2005 | Ono | ........................... 713/300 |
| 2005/0099646 | A1 * | 5/2005 | Jeyachandran et al. | ..... 358/1.14 |
| 2005/0108530 | A1 * | 5/2005 | Tonegawa | .................... 713/170 |
| 2005/0160221 | A1 * | 7/2005 | Yamazaki et al. | ........... 711/114 |
| 2006/0005159 | A1 * | 1/2006 | Nakamoto et al. | .......... 717/105 |
| 2006/0064741 | A1 * | 3/2006 | Terao | ............................. 726/4 |
| 2006/0069691 | A1 * | 3/2006 | Kawai | ......................... 707/100 |
| 2006/0190521 | A1 * | 8/2006 | Kojima | ........................ 709/200 |
| 2007/0011198 | A1 * | 1/2007 | Fukui et al. | ............... 707/104.1 |
| 2007/0130298 | A1 * | 6/2007 | Matsuhara et al. | .......... 709/221 |

FOREIGN PATENT DOCUMENTS

JP   2003-186653 A   *   7/2003   ................. 713/323
JP   2004-213469 A       7/2004

* cited by examiner

*Primary Examiner*—Eddie P Chan
*Assistant Examiner*—Idriss N Alrobaye
(74) *Attorney, Agent, or Firm*—Canon U.S.A., Inc. I.P. Division

(57) ABSTRACT

A data processing apparatus and method configured to load a program corresponding to each of a plurality of functions into a memory, the apparatus and method including storing a program for a specific function from among the plurality of functions, storing a program for a function different from the specific function from among the plurality of functions, loading the program for the specific function into the memory, and loading the program for the function different from the specific function into the memory after power is supplied to the second storage unit based on a request for accessing the second storage unit generated during execution of the program for the specific function.

15 Claims, 17 Drawing Sheets

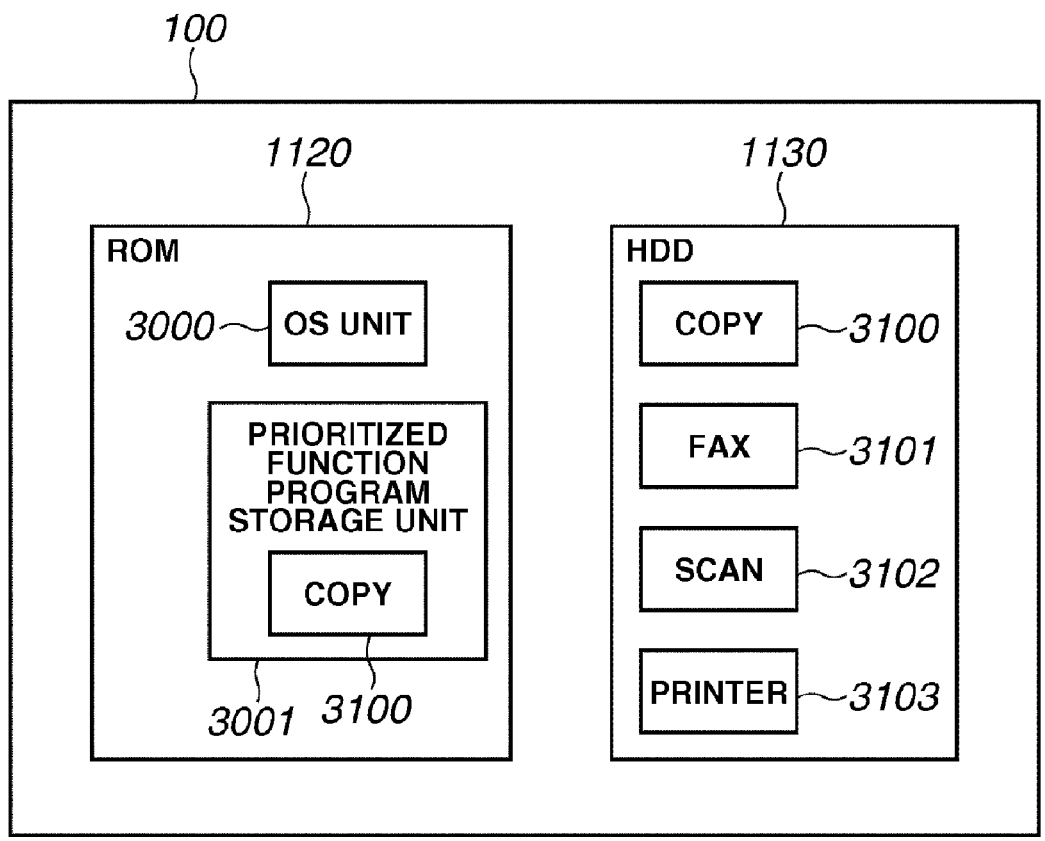

| FUNCTION LOADING MANAGEMENT TABLE | | | |
|---|---|---|---|
| MANAGEMENT NUMBER | FUNCTION NAME | PRIORITIZED FUNCTION FLAG | LOADING COMPLETION FLAG |
| 0 | COPY | FALSE | TRUE |
| 1 | FAX | FALSE | TRUE |
| 2 | SCAN | TRUE | TRUE |
| 3 | PRINTER | FALSE | TRUE |

FIG.20

| DIRECTORY INFORMATION |
|---|
| PROGRAM CODE CORRESPONDING TO STEPS IN FLOW CHART ILLUSTRATED IN FIG. 6 |
| PROGRAM CODE CORRESPONDING TO STEPS IN FLOW CHART ILLUSTRATED IN FIG. 7 |
| PROGRAM CODE CORRESPONDING TO STEPS IN FLOW CHART ILLUSTRATED IN FIG. 10 |
| PROGRAM CODE CORRESPONDING TO STEPS IN FLOW CHART ILLUSTRATED IN FIG. 16 |
| PROGRAM CODE CORRESPONDING TO STEPS IN FLOW CHART ILLUSTRATED IN FIG. 19 |
| |

DATA PROCESSING APPARATUS CONFIGURED TO LOAD A PROGRAM CORRESPONDING TO EACH OF A PLURALITY OF FUNCTIONS INTO A MEMORY AND EXECUTE THE LOADED PROGRAM, AND METHOD FOR LOADING PROGRAMS IN THE DATA PROCESSING APPARATUS

BACKGROUND OF THE INVENTION

1. Field of the Invention

The present invention relates to processing for loading a program corresponding to a plurality of functions.

2. Description of the Related Art

<Function-Limited Program>

Conventionally, in a data processing apparatus capable of executing a plurality of functions, i.e., a digital multifunction peripheral (MFP), a program is stored in a hard disk unit as a binary image. At the time of executing the program, the program is loaded into a random access memory (RAM) to be executed by a central processing unit (CPU).

A program in such a data processing apparatus includes a plurality of functions. Furthermore, as performance and functions of an MFP increase, the size of the program binary image increases. Accordingly, it takes a considerably long time to deploy a program binary image from a hard disk unit to a RAM. Thus, the activation time required to make a digital processing apparatus operational has increased. Accordingly, even in a case where a user desires to utilize only a specific function, the user needs to wait until the programs for all the functions are completely loaded.

To overcome such a problem, for example, Japanese Patent Application Laid-Open No. 2004-213469 discusses a method in which a small-size program limited to a specific function is provided. According to the method discussed in Japanese Patent Application Laid-Open No. 2004-213469, a program is exclusively loaded per each function with which an apparatus is provided. In this method, by loading a program limited to a specific function, the apparatus activation time can be shortened.

This method, however, is not the most efficient for shortening the apparatus activation time, given that all of the functions of an MFP are generally desired by a user. More specifically, when a program is set not to be activated, it cannot be activated even when a user requests a function that the program can implement. That is, in a case where a user enables a specific function (i.e., copy function) of a digital MFP, functions other than the copy function are not enabled.

As a method for addressing the above defectives, a configuration of "dividing a program" and a "program storing medium" can be combined. In this combined configuration, a program for enabling a function to which a high priority is given is stored in a high speed flash memory, and the other programs are stored in a hard disk.

In this configuration, a program dealing with a high priority function is first loaded from a high speed flash memory and becomes available. Then, the other functions are serially loaded from a hard disk and become available.

Serially loading the functions from the hard disk causes the hard disk to turn on and off. Hard disks typically have restrictions on the number of times they can be powered-on/off, and a current-carrying time. Exceeding these restrictions can affect the reliability of the hard disk. Accordingly, implementation of the above-described configuration can result degrade the reliability of a hard disk.

It has been proposed to provide a "split program" configuration to a digital MFP. In the split program configuration, a large-sized program is divided into small-sized modules. Binary images of the modules are serially loaded into a RAM, so that the functions become serially available.

With this configuration, after a digital MFP is powered on, a specific function having a higher priority, for example, a copy function, is activated first. Then, a printer function, a scan function, and a fax function become serially operational.

In addition, in order to shorten an apparatus' activation time, a hard disk unit can be substituted with a non-volatile memory device that operates at a high speed, which is typically a flash memory.

However, in the case of a high-performance digital MFP, the size of a program binary image is large. Therefore, to temporarily store data for internal processing, a hard disk is used. Thus, considering the size necessary for a storage medium and the manufacturing cost, it is not favorable to substitute a hard disk unit with a non-volatile memory such as a flash memory.

Accordingly, a digital MFP generally includes both a relatively small-sized flash memory (a first storage unit storing a program corresponding to a first function) and a hard disk unit (a second storage unit storing the other programs corresponding to second functions).

However, when a second storage unit is configured by a storage unit that is rotationally driven, such as a hard disk, if an activation timing of a hard disk is set to turn on the power, a number of issues arise. For example, the activation time of the hard disk increases considerably in proportion to an activation time of the MFP. In addition, the life cycle of a hard disk drive is shortened due to wearing of a bearing that arises from rotational driving.

In a case where, at the time of powering-on of a digital MFP, programs for a function stored in a first storage unit and programs for other functions stored in a second unit are all loaded to a RAM, it takes a considerably long time until a function stored in a first storage unit becomes available. Accordingly, a user cannot operate a function stored in a first storage unit within a short waiting time.

Thus, in a conventional digital MFP, the timing for loading a program stored in a first storage unit and the timing for loading a program stored in a second storage unit are controlled to be synchronized. Accordingly, it takes a considerably long time until a specific function becomes operational and a life cycle of a second storage unit is shortened.

SUMMARY OF THE INVENTION

The present invention is directed to a method in which, while a program corresponding to a specific function is being executed, a program corresponding to another function can be loaded in response to a request for accessing to a storage unit storing the other program.

According to an aspect of the present invention, a data processing apparatus configured to load a program corresponding to each of a plurality of functions into a memory and execute the program, the apparatus includes a first storage unit configured to store a program for a specific function from among the plurality of functions, a second storage unit configured to store a program for a function different from the specific function, a first loading control unit configured to load the program for the specific function from the first storage unit into the memory, and a second loading control unit configured to load the program for the function different from the specific function from the second storage unit into the memory after power is supplied to the second storage unit according to a request for accessing the second storage unit generated during execution of the program for the specific function.

According to another aspect of the present invention, a method for loading programs in a data processing apparatus configured to load a program corresponding to each of a plurality of functions into a memory and execute the program, the method includes storing a program for a specific function from among the plurality of functions in a first storage unit, storing a program for a function different from the specific function in a second storage unit, loading the program for the specific function from the first storage unit into the memory, loading the program for the function different from the specific function from the second storage unit into the memory after power is supplied to the second storage unit according to a request for accessing the second storage unit generated during execution of the program for the specific function.

According to yet another aspect of the present invention, a computer-readable storage medium stores computer-readable process steps for controlling a computer to execute the method of loading programs.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates a configuration of a memory in the controller unit illustrated in FIG. 2 according to the first exemplary embodiment of the present invention.

FIG. 4 illustrates a configuration of a function loading management table illustrated in FIG. 2 according to the first exemplary embodiment of the present invention.

FIG. 20 illustrates a memory map of a storage medium that stores various data processing programs that can be read by a data processing apparatus according to a fifth exemplary embodiment of the present invention.

DETAILED DESCRIPTION OF THE EXEMPLARY EMBODIMENTS

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

First Exemplary Embodiment

Figure 1:
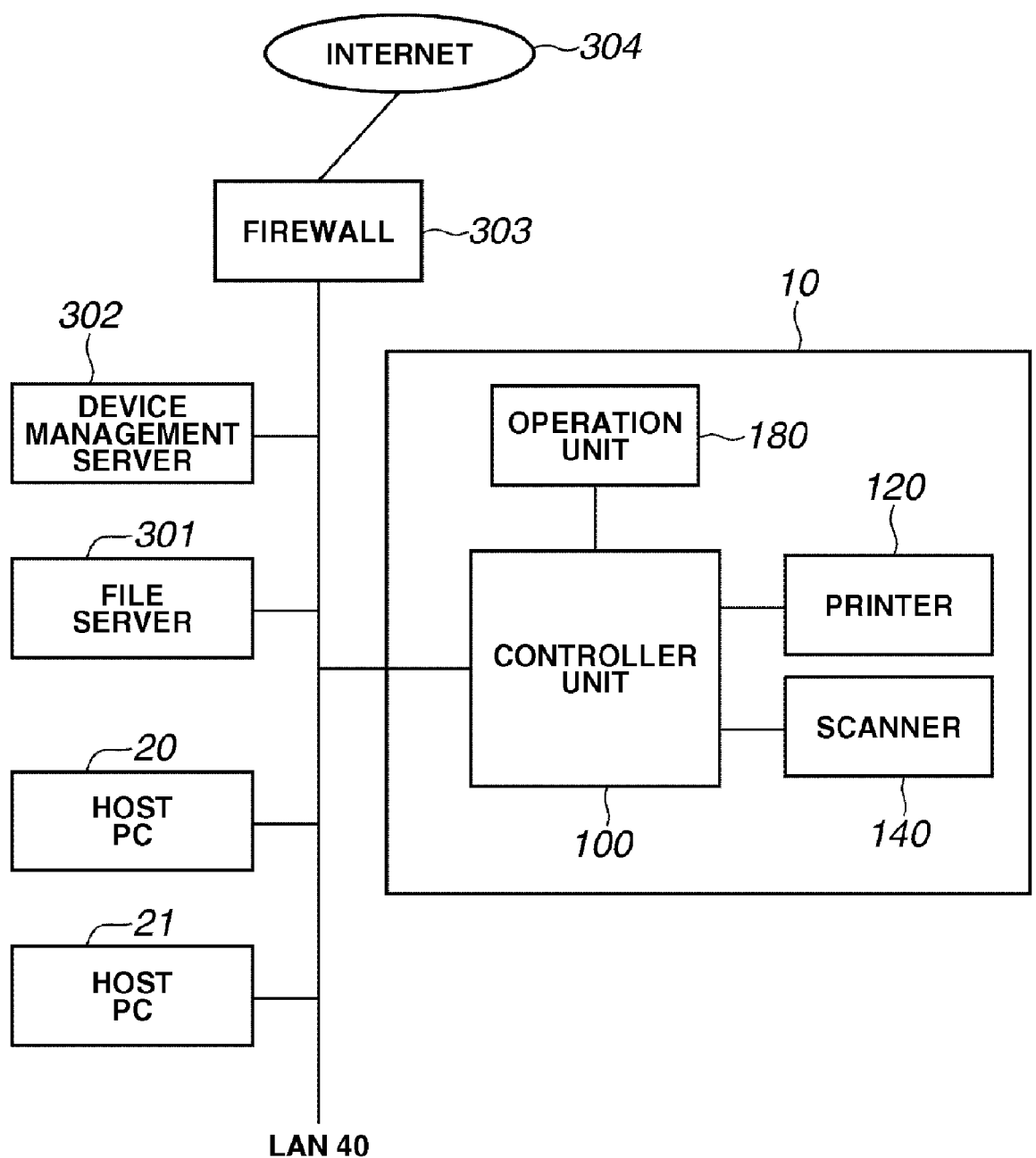
FIG. 1 illustrates an exemplary configuration of a data processing system including a data processing apparatus according to a first exemplary embodiment of the present invention.

FIG. 1 illustrates a configuration of a data processing system including a data processing apparatus according to a first exemplary embodiment of the present invention. In the present exemplary embodiment, the data processing apparatus is an MFP including a first and a second storage unit that have different access speeds and data capacity. However, the present invention can also be applied to other types of data processing apparatuses including a first and a second storage unit having different access speeds and data capacity.

Referring to FIG. 1, the data processing system according to the first exemplary embodiment includes a firewall 303, wherein the data processing system is connected to the Internet 304 via the firewall 303. A device management server 302 manages a digital MFP 10, host personal computers (PCs) 20 and 21, and a file server 301, which are connected via a local area network (LAN) 40. The firewall 303 is also connected to the LAN 40. A plurality of users operating client computers (not shown) connected to the LAN 40 are able to share data using the file server 301.

The digital MFP 10 principally includes a function for inputting and outputting an image. The digital MFP 10 includes an operation unit 180 for a user to perform various operations. An image scanner 140 reads an image according to an instruction from the operation unit 180 and the host PCs 20 and 21 to generate image data. A printer 120 prints out data obtained from the host PCs 20 and 21 and the file server 301 onto a recording medium. A controller unit 100 controls input and output of image data to and from the image scanner 140 and the printer 120 according to an instruction from the operation unit 180 and the host PCs 20 and 21.

The controller unit 100 performs control, for example, to accumulate image data generated by the image scanner 140 into a memory in the controller unit 100, to output the image data to the host PCs 20 and 21, or to print the image data by the printer 120.

Furthermore, the digital MFP 10 includes a unit (not shown) for activating a specific function having a higher priority among a plurality of functions that the digital MFP 10 includes. That is, a function such as copy, fax, scan, and printer functions is activated at a time of restoration from a power saving mode or at a time of powering-on the digital MFP 10.

Figure 2:
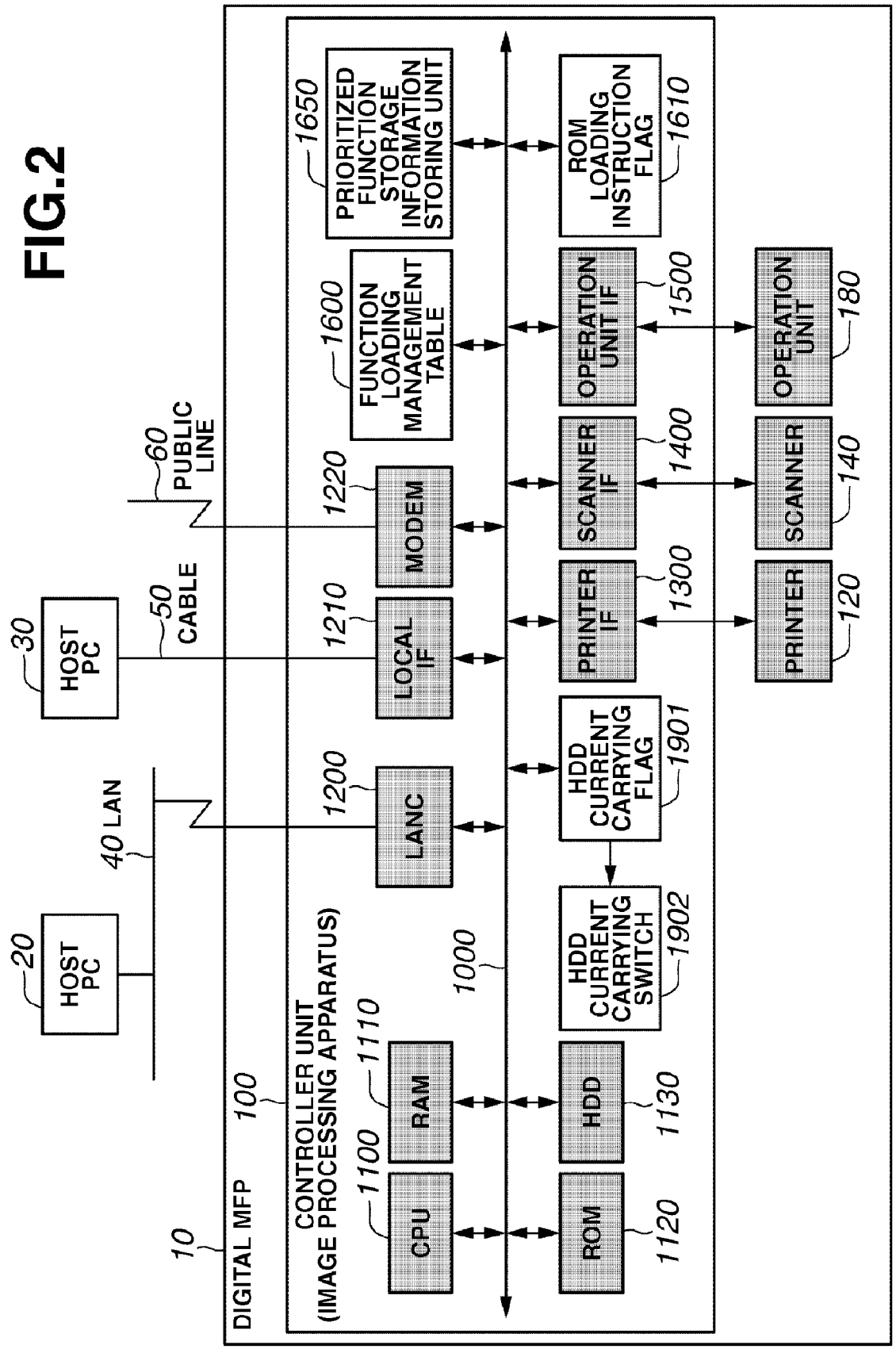
FIG. 2 illustrates a configuration of the digital MFP and a controller unit illustrated in FIG. 1 according to the first exemplary embodiment of the present invention.

FIG. 2 illustrates an exemplary configuration of the digital MFP 10 and the controller unit 100 illustrated in FIG. 1.

Referring to FIG. 2, the controller unit 100 is connected to the image scanner 140, which is an image input device, via scanner I/F 1400 and to the printer 120, which is an image output device, via printer I/F 1300. Both the scanner I/F 1400 and the printer I/F 1300 perform conversion between synchronous image data and asynchronous image data. The controller unit 100 is also connected to the LAN 40 via LAN controller (LANC) 1200, a public line (wide area network (WAN)) 60 via modem 1220, a host PC 30 via local interface 1210, and the operation unit 180 via operation unit I/F 1500.

The LANC 1200 receives image data to be output via the operation unit 180, the host PC 20, or from an output management apparatus (not shown). The local interface 1210, is for example, a USB or Centronics interface, and is connected to host PC 30 or a printer (not shown) via cable 50. The modem 1220 inputs and outputs data via public line 60. The operation unit I/F 1500 outputs to the operation unit 180 image data to be displayed on the operation unit. In addition, the operation unit I/F 1500 send information input by a user via the operation unit 180 to the CPU 1100.

A CPU 1100 controls the entire controller unit 100. A RAM 1110 is a system work memory used for operating the CPU 1100, and is an image memory for temporarily storing image data. A read only memory (ROM) 1120 is a boot ROM that stores a boot program of the system. The ROM 1120 is a semiconductor memory and includes a flash memory that can be rewritten.

The ROM 1120 stores system software for implementing a function that is to be operational on a priority basis, namely, an operating system (OS) and a program for a specific function. Furthermore, in the present embodiment, the ROM 1120 functions as a first storage unit and stores a specific function executed on a priority basis by a user, for example, a program for a copy function. Note that a program to be stored in the ROM 1120 can be arbitrarily selected and specified by a user. A hard disk drive (HDD) 1130 stores system software, image data, and a software counter value.

The system software is a program for implementing functions such as copy, fax, scan, and printer functions, and is deployed in the RAM 1110. A program for a function can include data required for implementing the function as well as a program for implementing the function.

For the software counter value, a counter area for each paper size and a counter area for each data processing capacity are set. The value is counted up using as a reference an arbitrary reference capacity value that is previously set based on a number of output images and the data capacity processed by the CPU 1100. A storage area for the counter value can also be provided, for example, in an electrically erasable programmable ROM (EEPROM) (not shown), instead of the HDD 1130, as long as the counter value can be maintained even when power is off.

A function loading management table 1600 stores information indicating which function, among the functions such as copy, fax, scan, and print, is to be operational on a priority basis at the time of restoration from a power-on state or a power saving mode of the digital MFP 10. An example of a configuration of a table is described below.

A ROM loading instruction flag 1610 is a flag for selecting a destination of a function program. When the ROM loading instruction flag 1610 is set to "true", the CPU 1100 loads the function program from the ROM 1120 to the RAM 1110. On the other hand, when the ROM loading instruction flag 1610 is set to "false", the CPU 1100 loads the function program from the HDD 1130 to the RAM 1110.

A prioritized function storage information storing unit 1650 maintains information used for specifying and storing into the ROM 1120 the function program to be activated on a priority basis when power is turned on after a power-off state. Here, a function to be activated on a priority basis can be a function that is arbitrarily selected by a user. Alternatively, a function to be activated can be a function that is more frequently used than other functions, while managing as a history a number of times the functions are executed.

An HDD current carrying flag 1901 is used for controlling whether current is to be carried to the HDD 1130. When the HDD current carrying flag 1901 is set to "false", the HDD current carrying flag 1901 indicates that current is not carried to the HDD 1130. When the HDD current carrying flag 1901 is set to "true", the HDD current carrying flag 1901 indicates that current is carried to the HDD 1130. At the time of powering-on of the digital MFP 10, the HDD current carrying flag 1901 is set to "false" (non-current carrying state).

The HDD current carrying switch 1902 is used for turning on or off the power to be supplied to the HDD 1130 according to a state of the HDD current carrying flag 1901. When the HDD current carrying flag 1901 is set to "false", the HDD current carrying switch 1902 is off. When the HDD current carrying flag 1901 is set to "true", the HDD current carrying switch 1902 is on. P The operation unit 180 includes input units such as numeric keys, a copy start button, a touch panel, and a display unit such as a liquid crystal display (LCD) device. The operation unit 180 is described in more detail below together with an external appearance thereof.

With the above configuration, the digital MFP 10 includes a plurality of functions such as a copy function, a fax sending/receiving function, a scan function, and a printing function. The digital MFP 10 loads a program separately provided for each of the plural functions into the RAM 1110 to execute the program.

As described, the digital MFP 10 includes the ROM 1120, which includes, for example, a flash memory, as a first unit. The first unit stores a program corresponding to a function from among the plural functions that is specified to be operational on a priority basis by a user. In addition, the digital MFP 10 includes the HDD 1130 (i.e., an external memory) functioning as a second storage unit for storing each program corresponding to the plural functions except the function that is specified to be operational on the priority basis by the user.

The CPU 1100, at the time of powering on of the digital MFP 10, restricts power supplied to the HDD 1130, supplies power to the ROM 1120, and loads a program for a specific function from the ROM 1120 to the RAM 1110. Furthermore, in response to a request for accessing the HDD 1130, which is issued while the program for the specific function is executed, the CPU 1100 supplies power to the HDD 1130 and controls loading of each program into the RAM 1110 to enable each of the programs corresponding to each of the plural functions.

The request for accessing the HDD 1130 issued during execution of the program for the specific function includes a request for storing image data onto the HDD 1130 in a case where all image data cannot be fully stored in the RAM 1110. For example, in the case where the specific function is a copy function, the RAM 1110 reads original image data into a work area of the RAM 1110. At this time, if all image data cannot be fully stored in the work area of the RAM 1110 due to a restriction on a capacity of the RAM 1110, the CPU 1100 stores the image data onto the HDD 1130. Note that this processing is an example. The processing performed here can be different from the processing described above, as long as the processing is performed in response to a request for accessing the HDD 1130.

In addition, the program for a specific function (hereinafter referred to as a "prioritized function") stored in the ROM 1120 is a program corresponding to a function selected by a user from among a plurality of functions. Here, a function name of the prioritized function selected by a user is stored in the prioritized function storage information storing unit 1650. In this case, the function name stored in the prioritized function storage information storing unit 1650 and a name of a function that the program stored in the ROM 1120 deals with, can differ from each other.

If it is determined that the name of the function which the program currently stored in the ROM 1120 deals with, and the function name stored in the prioritized function storage information storing unit 1650, differ from each other, the CPU 1100 performs the following processing. The CPU 1100 stores into the ROM 1120 a program corresponding to a function stored in the prioritized function storage information storing unit 1650 among the plural programs stored in the HDD 1130, to update the prioritized function.

FIG. 3 illustrates an exemplary configuration of a memory in the controller unit 100 illustrated in FIG. 2. More specifically, FIG. 3 illustrates a storage example of a program in the case where a split program that enables a high speed activation is used in the image processing system illustrated in FIG. 1. In this example, programs for all functions are stored in the HDD 1130, and a program to be operational on a priority basis is stored in the ROM 1120.

Referring to FIG. 3, the ROM 1120 includes an OS unit 3000 and a prioritized function program storage unit 3001. The prioritized function program storage unit 3001 previously stores one of the programs stored in the HDD 1130. In the example illustrated in FIG. 3, the prioritized function program storage unit 3001 currently stores a program for copy function 3100 among the functions stored in the HDD 1130. Note that depending on a capacity of the prioritized function program storage unit 3001 and a size of the programs stored in the HDD 1130, one or more programs can be stored in the prioritized function program storage unit 3001. The operating system (OS) 3000 is a basic program for controlling the entire system.

The program for copy function 3100 includes a program and data for executing the copy function (in the present embodiment, the program and data for executing the copy function are referred to as a "copy program"). The HDD 1130 stores a program for fax function 3101 including a program and data for executing a fax function (in the present embodiment, the program and data for executing the fax function are referred to as a "fax program").

The HDD 1130 also stores a program for scan function 3102 including a program and data for executing a scan function (in present embodiment, the program and data for executing the scan function are referred to as a "scan program"). In addition, the HDD 1130 stores a program for print function 3103 including a program and data for executing a print function (in the present embodiment, the program and data for executing the print function are referred to as a "print program").

When the digital MFP 10 is powered on, the CPU 1100 loads an OS including a boot program. Then, the programs stored in the prioritized function program storage unit 3001 are serially loaded from the ROM 1120 to the RAM 1110. Thus, the CPU 1100 can enable the prioritized function. The programs other than the program for the prioritized function are loaded from the HDD 1130 to the RAM 1110 when a request for accessing to the HDD 1130 is issued. Furthermore, the program stored in the prioritized function program storage unit 3001 is not fixed. That is, a function name, stored in the storing unit 1650, of prioritized function storage information can be rewritten by a user.

FIG. 4 illustrates an exemplary configuration of the function loading management table 1600 illustrated in FIG. 2. More specifically, the function loading management table 1600 includes a management number 1601, a function name 1602, a prioritized function flag 1603, and a load completion flag 1604.

The function name 1602 indicates a name of a function and is identification information for identifying a function. The prioritized function flag 1603 is a flag indicating whether a function is to be operational as a prioritized function. When the prioritized function flag 1603 is set to "true", a corresponding function is handled as a prioritized function. When the load completion flag 1604 is set to "true", a program corresponding to the function is already loaded to the RAM 1110.

The CPU 1100 determines an order of loading the programs according to the management number 1601. Accordingly, by changing an initial value of the function loading management table 1600, the order of loading the programs can be changed.

A setting value for the prioritized function flag 1603 can also be changed by a user. The prioritized function flag 1603 for a function corresponding to the function name stored in the storing unit 1650 of prioritized function storage information can be rewritten to "true".

Figure 5:
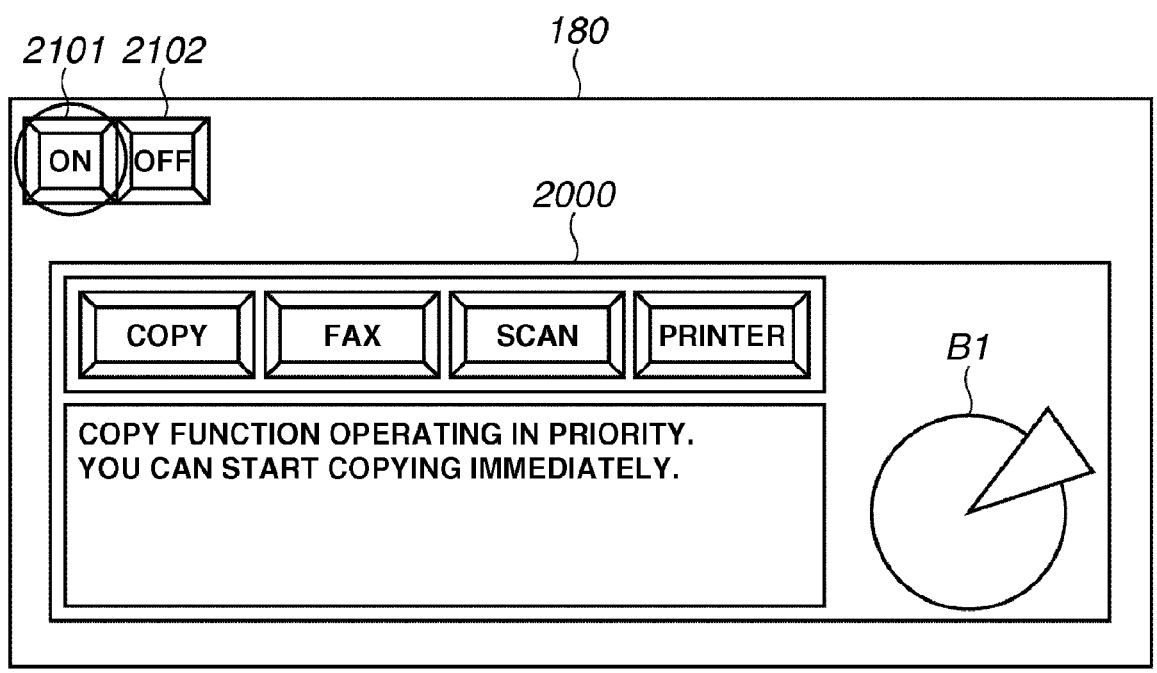
FIG. 5 illustrates an external appearance of an operation unit illustrated in FIG. 1 according to the first exemplary embodiment of the present invention.

FIG. 5 illustrates an example of an external appearance of the operation unit 180 illustrated in FIG. 1. In this example, the operation unit 180 includes a liquid crystal panel and a touch panel. More specifically, the operation unit 180 includes a function operation unit 2000, a power-on switch 2101, and a power-off switch 2102. A user issues an instruction to the controller unit 100 via a button and an icon displayed on the liquid crystal panel.

The function utilization operation unit 2000 includes an input unit including numeral keys, a copy start button, a touch panel, and a display unit such as an LCD display device. Using the function utilization operation unit 2000, a user can switch a function to a desirable one, give an instruction for activating an operation, and display a state of the digital MFP 10. Furthermore, the function utilization operation unit 2000 includes buttons for powering on and off the digital MFP 10. More specifically, when a user presses the power-on switch 2101, the digital MFP 10 is turned on. When a user presses the power-off switch 2102, the digital MFP 10 is turned off. In addition, the function utilization operation unit 2000 includes a start button B1. A user gives an instruction for starting an execution of a function to the controller unit 100 by operating the start button B1.

Figure 6:
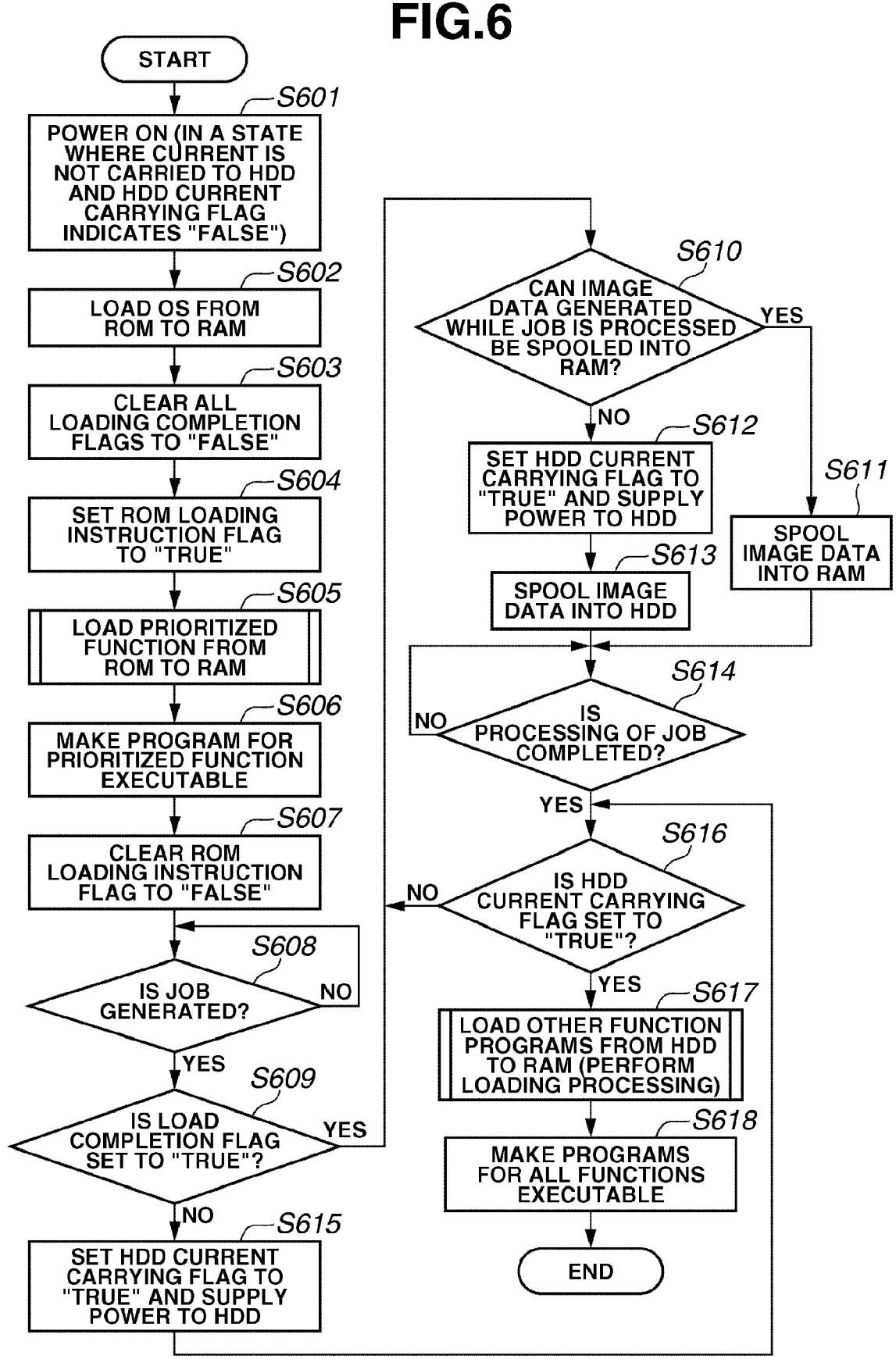
FIG. 6 is a flow chart illustrating an example of processing of data performed in a data processing apparatus according to the first exemplary embodiment of the present invention.

FIG. 6 is a flow chart illustrating an example of data processing performed in the data processing apparatus according to the present embodiment. In the present embodiment, as an example, boot processing is described which is performed at the time of powering-on the digital MFP 10 while enabling a specific function of the plural functions on a priority basis. The processing illustrated in this flow chart is performed by the controller unit 100.

In the present exemplary embodiment, when a user powers on the digital MFP 10, the CPU 1100 loads a program for a specific function from the ROM 1120 to the RAM 1110 according to a state indicated in the function loading management table 1600 to enable the program for a specific function. After that, the CPU 1100 loads and enables the other programs from the HDD 1130 until all the functions become operational.

In step S601, a user presses the power-on switch 2101 of the operation unit 180 to turn on the digital MFP 10. Next in step S602, the CPU 1100 loads the OS 3000, which is stored in the ROM 1120, into the RAM 1110. In step S603, the CPU 1100 sets all the load completion flags 1604 in the function loading management table 1600 to "false". Then, the processing advances to step S604.

In step S604, the CPU 1100 sets the ROM loading instruction flag 1610 to "true". In step S605, the CPU 1100 loads a program for a prioritized function stored in the ROM 1120 into the RAM 1110. A more detailed description of step S605 is provided below. Then, the processing advances to step S606. In step S606, the CPU 1100 executes the program, e.g., a program for the copy function, already loaded to the RAM 1110. By performing step S606, the specific function specified as a prioritized function can be enabled.

In step S607, the CPU 1100 clears the ROM loading instruction flag 1610, which is illustrated in FIG. 2, to "false". By performing step S607, the CPU 1100 hereafter loads the program from the HDD 1130 to the RAM 1110. Next, n step S608, the CPU 1100 detects whether a job using a function of copy, fax, scan, and printer functions is generated. If the CPU 1100 detects that a job is generated, the processing advances to step S609. The CPU 1100 detects that a job is generated when a function selection button in the function utilization operation unit 2000 of the operation unit 180 is pressed by the user, when the modem 1220 receives a facsimile, or when the local I/F 1210 or the LANC 1200 receives print data.

In step S609, the CPU 1100 refers to the load completion flag 1604 in the function loading management table 1600 to determine whether the flag for a function used in the detected job is set to "true". If it is determined in step S609 that the flag is set to "true", then the processing advances to step S610. If it is determined in step S609 that the flag is set to "false", then the processing advances to step S615.

In step S610, the CPU 1100 performs the detected job and determines whether image data generated in the course of processing the job is of a size in which the image data can be spooled in the RAM 1110. If it is determined that the image data is of a size in which the image data can be spooled in the RAM 1110, the processing advances to step S611. If it is determined that the image data is of a size in which the image data cannot be spooled in the RAM 1110, the processing advances to step S612.

In step S611, the CPU 1100 performs spooling of the image data generated in the course of processing the job, into the RAM 1110. After that, the processing advances to step S614. On the other hand, in step S612, the CPU 1100 sets the HDD current carrying flag 1901 to "true". When the HDD current carrying flag 1901 is set to "true", the HDD current carrying switch 1902 is turned on, and power is supplied from a power source unit (not shown) to the HDD 1130. After that, the processing advances to step S613.

In step S613, the CPU 1100 performs spooling of image data generated in the course of processing the job into the HDD 1130. In step S614, the CPU 1100 waits for an end of the job. After the job is completed, the CPU 1100 advances to step S616.

If it is determined in step S609 that the flag for a function used in the detected job is set to "false", the processing advances to step S615. In step S615, the CPU 1100 sets the HDD current carrying flag 1901 to "true". When the HDD current carrying flag 1901 is set to "true", the HDD current carrying switch 1902 is turned on, and power is supplied to the HDD 1130. Then, the processing advances to step S616.

In step S616, the CPU 1100 refers to the HDD current carrying flag 1901 to determine whether the HDD current carrying flag 1901 is set to "true". If it is determined that the flag 1901 is set to "true", the processing advances to step S617. On the other hand, if it is determined that the flag 1901 is set to "false", the processing returns to step S610.

In step S617, the CPU 1100 performs processing for loading unloaded programs, which are stored in the HDD 1130, into the RAM 1110. A detailed description of the process in step S617 is provided below. Then, the processing advances to step S618. In step S618, the CPU 1100 enables the programs for all the functions loaded into the RAM 1110, and then the processing ends.

In the present embodiment, in step S610, if the image data generated in the course of processing the job cannot be fully stored in the RAM 1110, a request for storing the image data into the HDD 1130 is generated. Programs not loaded to the RAM 1110 at the time of powering on the digital MFP 10 can be loaded from the HDD 1130 to the RAM 1110 when the request for storing the image data into the HDD 1130 is issued.

That is, when the digital MFP 10 is powered on, instead of enabling all the functions, the CPU 1100 immediately loads the program corresponding to a specific function desired by a user into the RAM 1110 to quickly respond to a request for executing the specific function specified by the user. Furthermore, the CPU 1100 loads the programs corresponding to the other functions stored in the HDD 1130 into the RAM 1110 at a timing at which a request for storing the programs into the HDD 1130 (i.e., a second storage unit) is generated, while the specific function is being performed. Thus, the other functions can also become operational.

Figure 7:
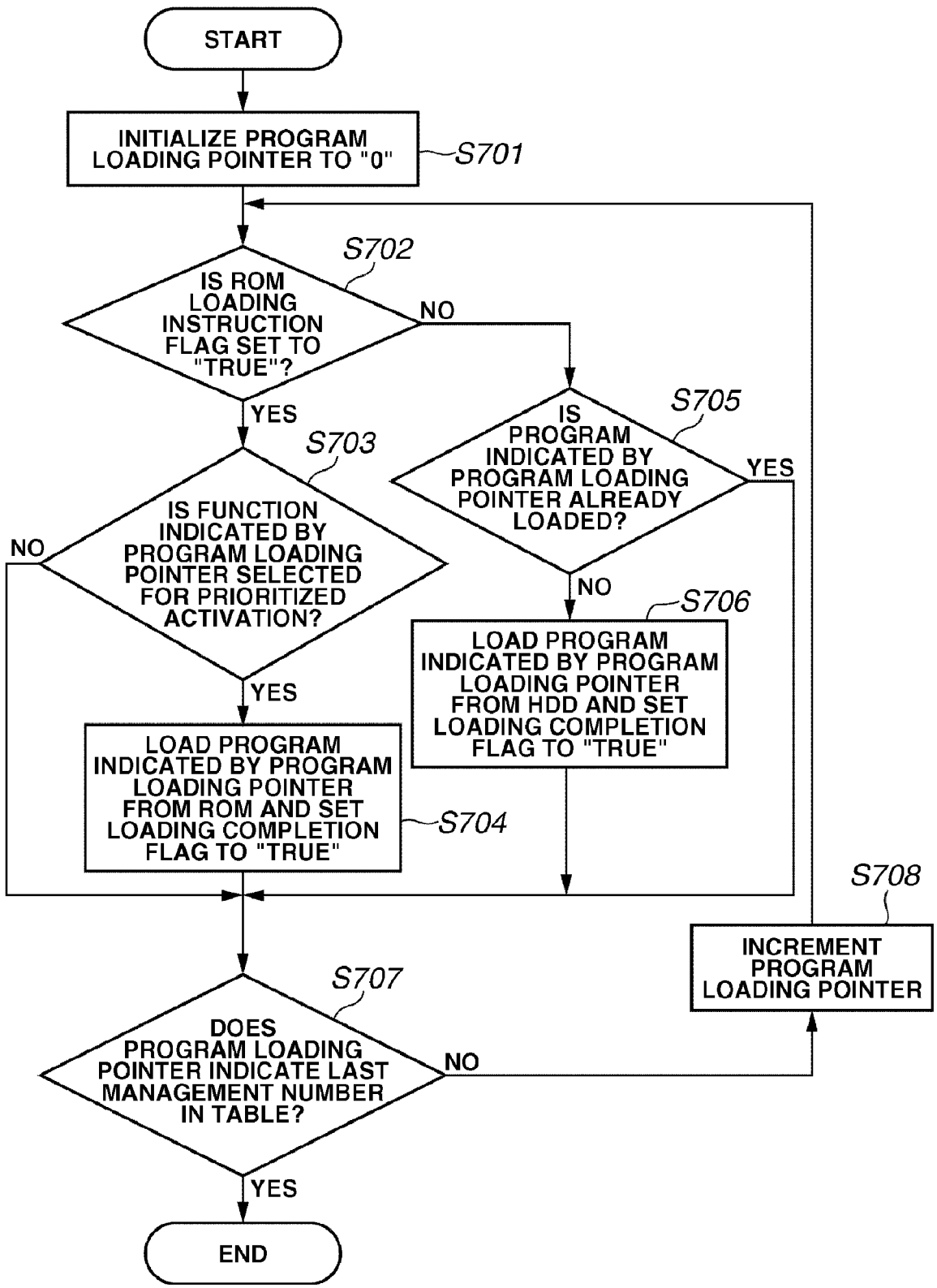
FIG. 7 is a flow chart illustrating an example of processing of data performed by the data processing apparatus according to the first exemplary embodiment of the present invention.

FIG. 7 is a flow chart illustrating an example of data processing performed by the data processing apparatus according to the present embodiment. This processing represents the detailed processing associated with steps S605 and S617 in FIG. 6. The processing illustrated in this flow chart is performed by the controller unit 100. More specifically, the controller unit 100 loads the program from the ROM 1120 or the HDD 1130 into the RAM 1110 according to the state of the function loading management table 1600 and the ROM loading instruction flag 1610. Further, the controller unit 100 controls the state of the load completion flag 1604 in the function loading management table 1600.

In addition, in the present embodiment, if the program is specified by the user using a program loading pointer to be activated on a priority basis, each prioritized program is loaded. Furthermore, if the ROM loading instruction flag 1610 is not set to "true", and the program is not loaded, even when the program is not specified to be activated on a priority basis, the program is loaded.

Turning to FIG. 7, in step S701, the CPU 1100 initializes a program loading pointer that is managed by the RAM 1110, to "0". The program loading pointer is an internal variable used for identifying a management number 1601, which is an object of the processing. The program loading pointer is stored in the function loading management table 1600.

In step S702, the CPU 1100 determines whether the ROM loading instruction flag 1610 corresponding to the management number 1601 indicated by the program loading pointer is set to "true". If it is determined that the ROM loading instruction flag 1610 is set to "true", the CPU 1100 advances to step S703. If it is determined in step S702 that the ROM loading instruction flag 1610 is not set to "true", the CPU 1100 advances to step S705.

In step S703, the CPU 1100 determines whether the prioritized function flag 1603 corresponding to the management number 1601 indicated by the program loading pointer is set to "true". If it is determined that the prioritized function flag 1603 is set to "true", which means that the program is selected by the user to be activated on a priority basis, then the processing advances to step S704. On the other hand, in the case where it is determined that the prioritized function flag 1603 is not set to "true", the processing advances to step S707.

In step S704, the CPU 1100 loads the program for the function corresponding to the management number 1601 indicated by the program loading pointer from the ROM 1120 into the RAM 1110. In addition, the CPU 1100 sets the load completion flag 1604 to "true". Then, the processing advances to step S707.

If it is determined in step S702 that the ROM loading instruction flag 1610 is not set to "true", the CPU 1100 advances to step S705 to determine whether the program for the function corresponding to the management number 1601 indicated by program loading pointer is already loaded. If the load completion flag 1604 corresponding to the management number 1601 indicated by the program loading pointer is set to "true", the processing advances to step S707.

If it is determined in step S705 that the program for the function corresponding to the management number 1601 indicated by the program loading pointer is not yet loaded, then the processing advances to step S706. In step S706, the CPU 1100 loads the program for the function corresponding to the management number 1601 indicated by the program loading pointer from the HDD 1130 to the RAM 1110. In addition, the CPU 1100 sets the load completion flag 1604 corresponding to the management number 1601 to "true". Then, the processing advances to step S707.

In step S707, the CPU 1100 determines whether a value for the program loading pointer indicates a last management number 1601 in the function loading management table 1600. If it is determined that the value for the program loading pointer indicates a last management number, then the processing ends. In the case where the value for the program loading pointer does not indicate a last management number, then the processing advances to step S708. In step S708, the CPU 1100 increments the value for the program loading pointer by one. Then, the processing returns to step S702.

Figure 8A:
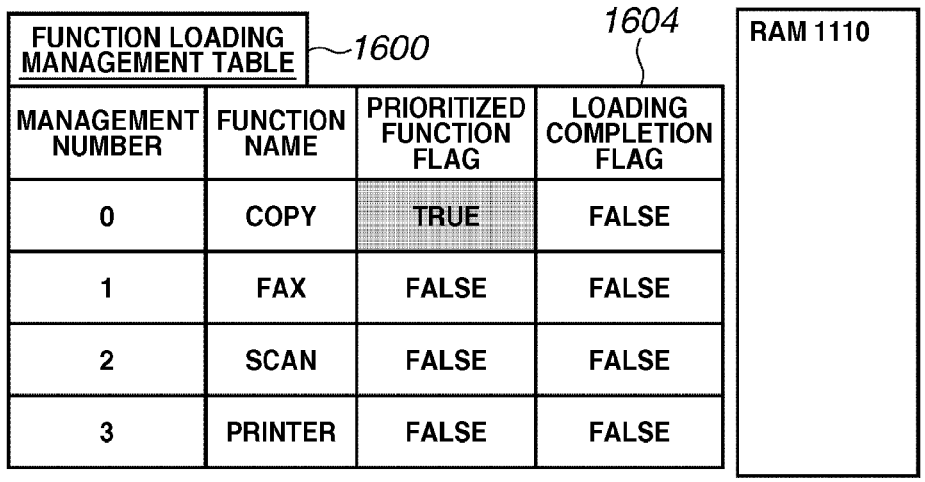
FIGS. 8A through 8C respectively illustrate a state in which a program is loaded into a RAM illustrated in FIG. 2 according to the first exemplary embodiment of the present invention.
Figure 8B:
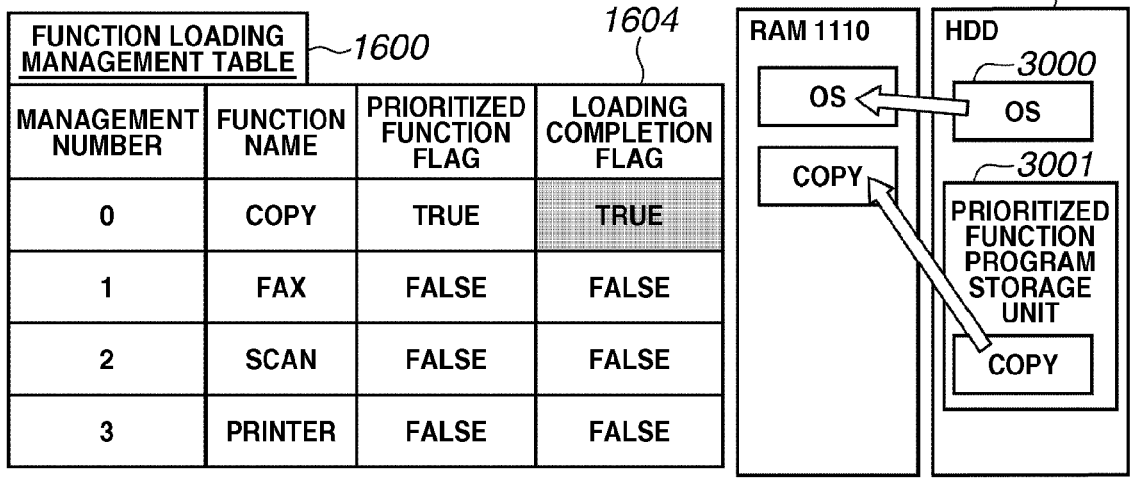
Figure 8C:
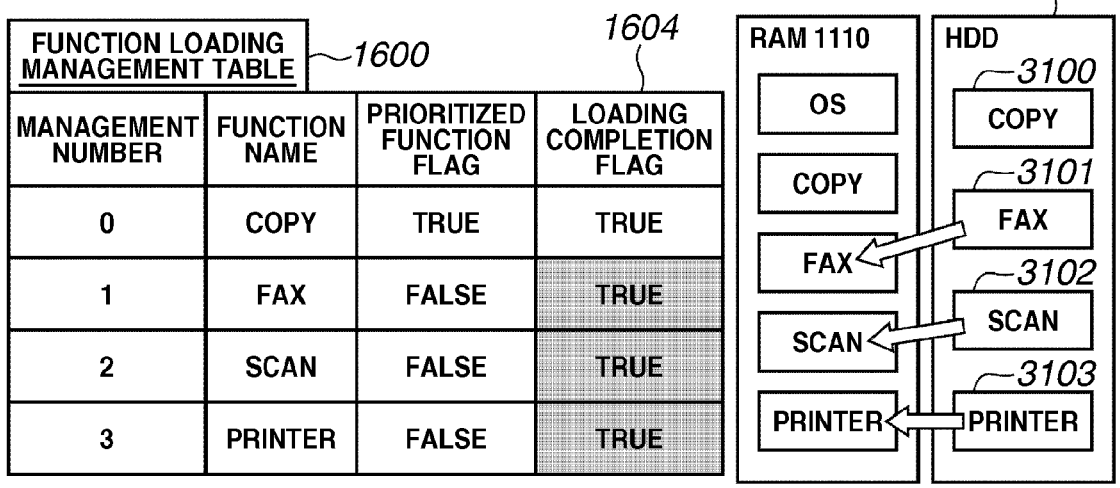

FIGS. 8A through 8C respectively illustrate a state in which the program is loaded into the RAM 1110. The examples depicted in each of FIGS. 8A through 8C illustrate a state of the program loaded into the RAM 1110 when the CPU 1100 loads the program having a split configuration into a work memory area of the RAM 1110.

FIG. 8A illustrates a state in which the digital MFP 10 is powered on and before a program for each function is loaded from the ROM 1120 and the HDD 1130 to the RAM 1110. This state corresponds to the state illustrated in the flow chart of FIG. 6 in which the processing is performed up to step S603. That is, in FIG. 8A, in the function loading management table 1600, the prioritized function flag 1603 for the copy function is set to "true" so that the copy function, whose management number 1601 is "0", previously becomes prioritized. In this state, no program of a function is loaded into the RAM 1110.

FIG. 8B illustrates a state in which the power-on switch 2101 in the operation unit 180 is pressed by a user and an OS and the copy program are downloaded from the ROM 1120 to the RAM 1110, thus enabling the program for a prioritized function. This state corresponds to the state illustrated in the flow chart of FIG. 6 in which the processing is performed up to step S606. In this state, the copy program is already deployed in the RAM 1110 (i.e., a main memory). Accordingly, the copy function can be executed, although the other functions cannot be used. In FIG. 8B, the load completion flag 1604 for the copy function in the function loading management table 1600 is set to "true" to indicate that the copy program is already loaded.

FIG. 8C illustrates a state in which the programs for all the functions that the digital MFP 10 has are loaded from the HDD 1130 into the RAM 1110. This state corresponds to the state illustrated in the flow chart in FIG. 6 in which the processing is performed up to step S618. In this state, all the functions that the digital MFP 10 has can be executed. In FIG. 8C, all the load completion flags 1604 in the function loading management table 1600 are set to "true" to indicate that the programs for all the functions are already loaded.

Figure 9:
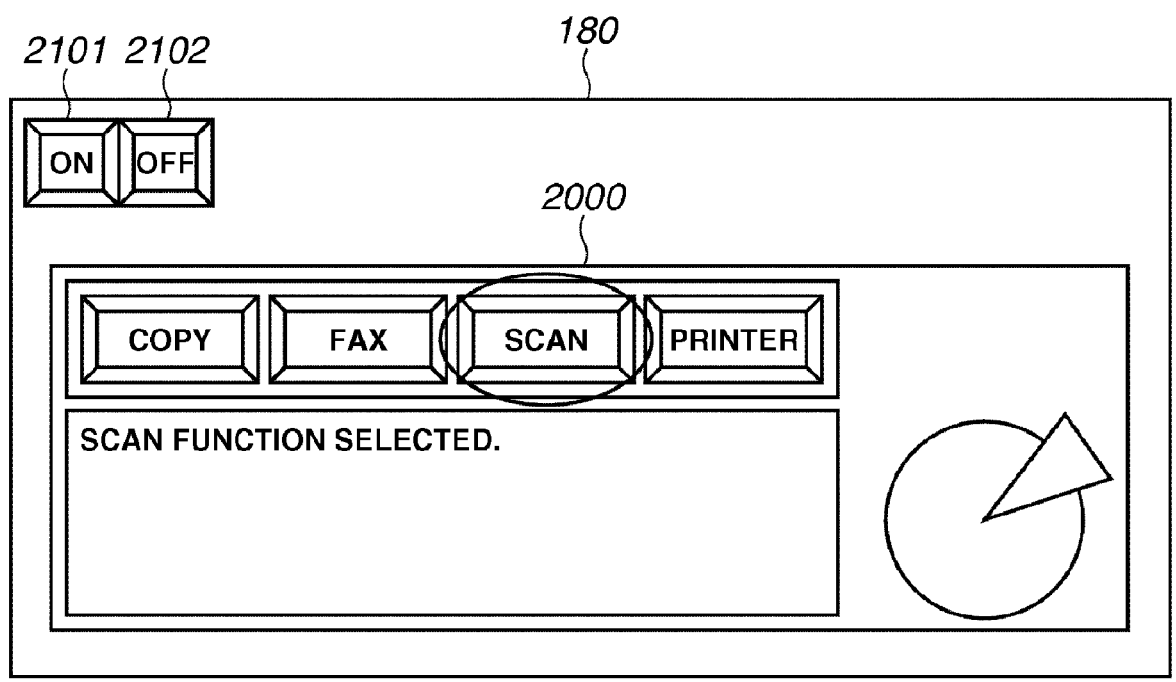
FIG. 9 illustrates an example of a prioritized function changing display shown in a function utilization operation portion of the operation unit illustrated in FIG. 1 according to the first exemplary embodiment of the present invention.

FIG. 9 illustrates an example of a prioritized function change display in the function utilization operation unit 2000 of the operation unit 180 illustrated in FIG. 1. In the present embodiment, a user can change the prioritized function by operating the function utilization operation unit 2000 in the operation unit 180 illustrated in FIG. 1. By this operation, the prioritized function indicated in the display screen in the operation unit 180 can be changed. Thus, as illustrated in FIG. 9, the function name stored in the storing unit 1650 of prioritized function storage information is updated to the name of the function changed by the user. For example, when the user selects the scan function as the prioritized function, the function name "scan" is stored in the storing unit 1650 of prioritized function storage information.

Figure 10:
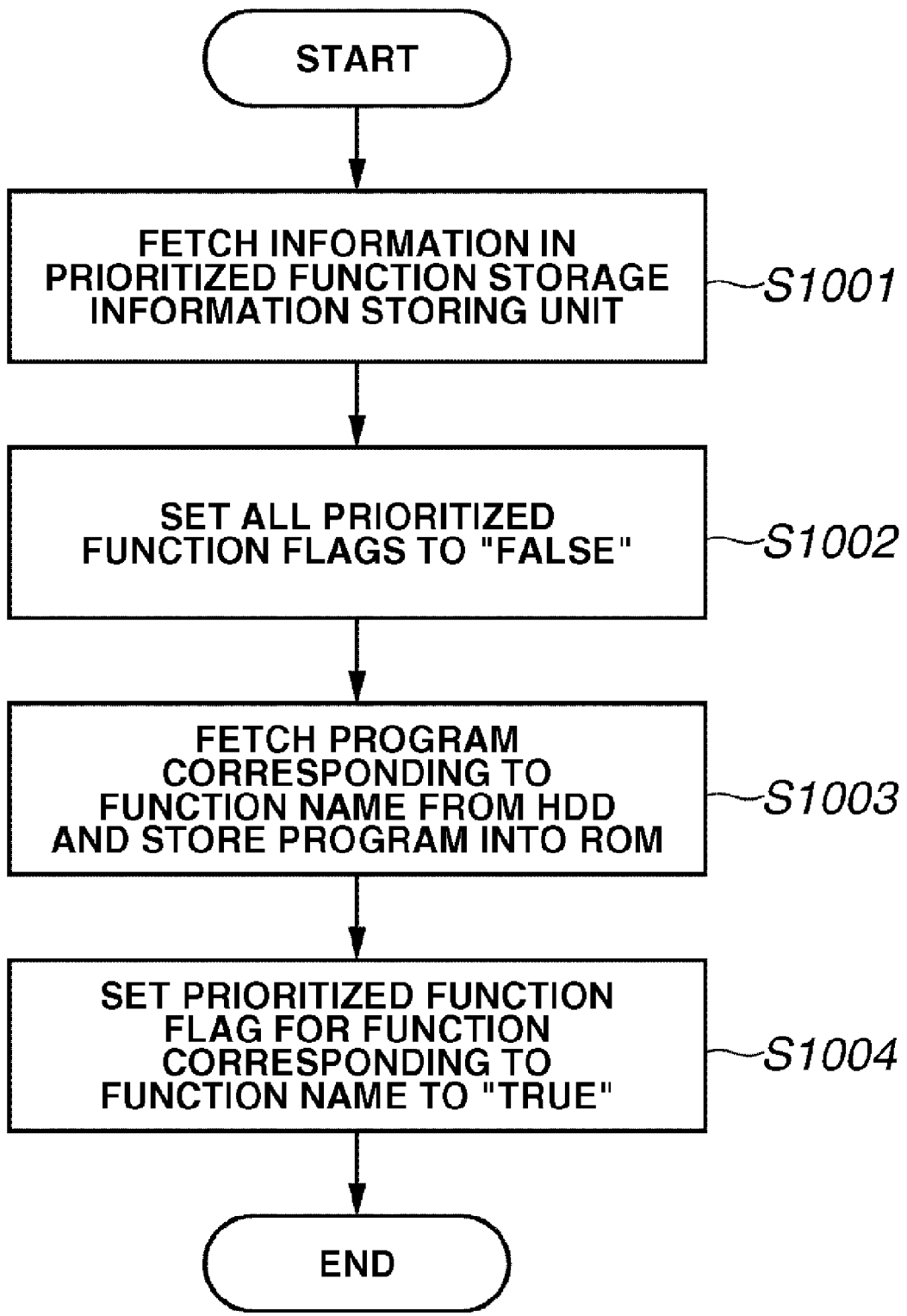
FIG. 10 is a flow chart illustrating an example of a flow of data processing performed by the data processing apparatus according to the first exemplary embodiment of the present invention.
Figures 11, 12:
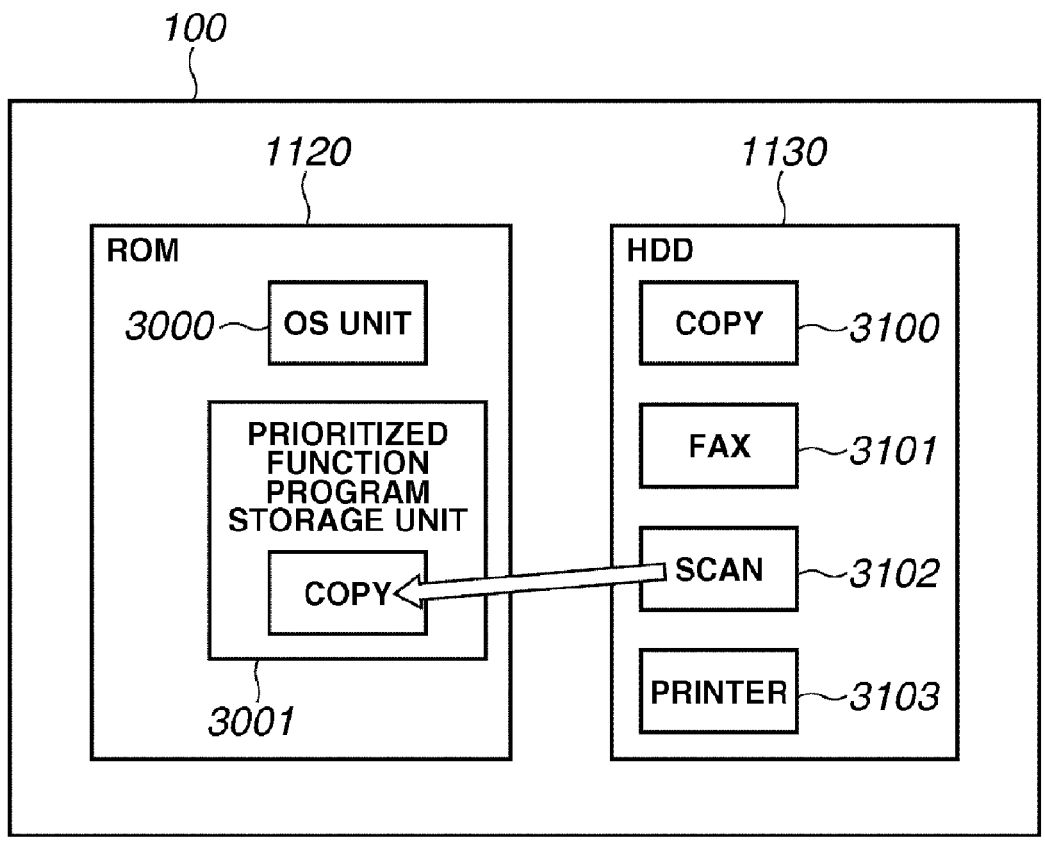
FIG. 11 illustrates a method of updating a program stored in the ROM illustrated in FIG. 2 according to the first exemplary embodiment of the present invention.
FIG. 12 illustrates a state in which the function loading management table illustrated in FIG. 2 is updated according to the first exemplary embodiment of the present invention.

FIGS. 10 through 12 illustrated processing for writing a program of a prioritized function into the ROM 1120 according to the present embodiment.

FIG. 10 is a flow chart illustrating an example of a flow of data processing performed by the data processing apparatus according to the present embodiment. The processing stores a program of a prioritized function into the ROM 1120 at the time of changing a prioritized function. More specifically, the CPU 1100 fetches the program of a function corresponding to the function name stored in the storing unit 1650 of prioritized function storage information illustrated in FIG. 2, and then stores the program into the prioritized program storage unit 3001 of the ROM 1120. In addition, FIG. 10 illustrates processing performed by the CPU 1100 from the start up to the processing in which the prioritized function flag 1603 for the concerned function in the function loading management table 1600 is set to "true".

First, in step S1001, the CPU 1100 fetches the function name stored in the storing unit 1650 of prioritized function storage information. For example, when the scan function is selected as illustrated in an operation screen shown in FIG. 9, the function name "scan" is fetched.

Next, in step S1002, the CPU 1100 sets all the prioritized function flags 1603 in the function loading management table 1600 to "false". By the processing in step S1002, the user can temporarily reset the prioritized function. In the processing beyond step S1002, the user can update a function as a prioritized function.

In step S1003, the CPU 1100 fetches, from the HDD 1130, the program corresponding to the function name stored in the storing unit 1650 of prioritized function storage information which was fetched in step S1001. Then, the CPU 1100 stores the program into the prioritized program storage unit 3001 of the ROM 1120. By the processing in step S1003, the program to be stored in the ROM 1120 and activated when a priority basis is updated. FIG. 11 illustrates a manner of updating the program stored in the ROM 1120. In this example, the scan program is loaded as the program of the prioritized function.

In step S1004, the CPU 1100 sets to "true" the prioritized function flag 1603 corresponding to the function name fetched in step S1001, from among the prioritized function flags 1603 in the function loading management table 1600, and then ends the processing. By the processing in step S1004, a new function is updated as the prioritized function.

FIG. 12 illustrates a state in which the function loading management table 1600 is updated. This example corresponds to the state in which the prioritized function flag 1603 in the function loading management table 1600 is updated. In this state, the scan function is selected by the user as the prioritized function. That is, only the prioritized function flag 1603 corresponding to the scan function whose management number 1601 is "2", is set to "true".

In the present embodiment, power is supplied to the HDD 1130 when the program for a function used in a generated job is not loaded, or when the size of the image data generated in processing a job is too large to be spooled into the RAM 1110. However, the configuration is not limited to these cases. That is, power can also be supplied to the HDD 1130 when a request for accessing to the HDD 1130 is issued in order to refer to a document stored in the HDD, or store data received through the facsimile function.

Second Exemplary Embodiment

Figure 13:
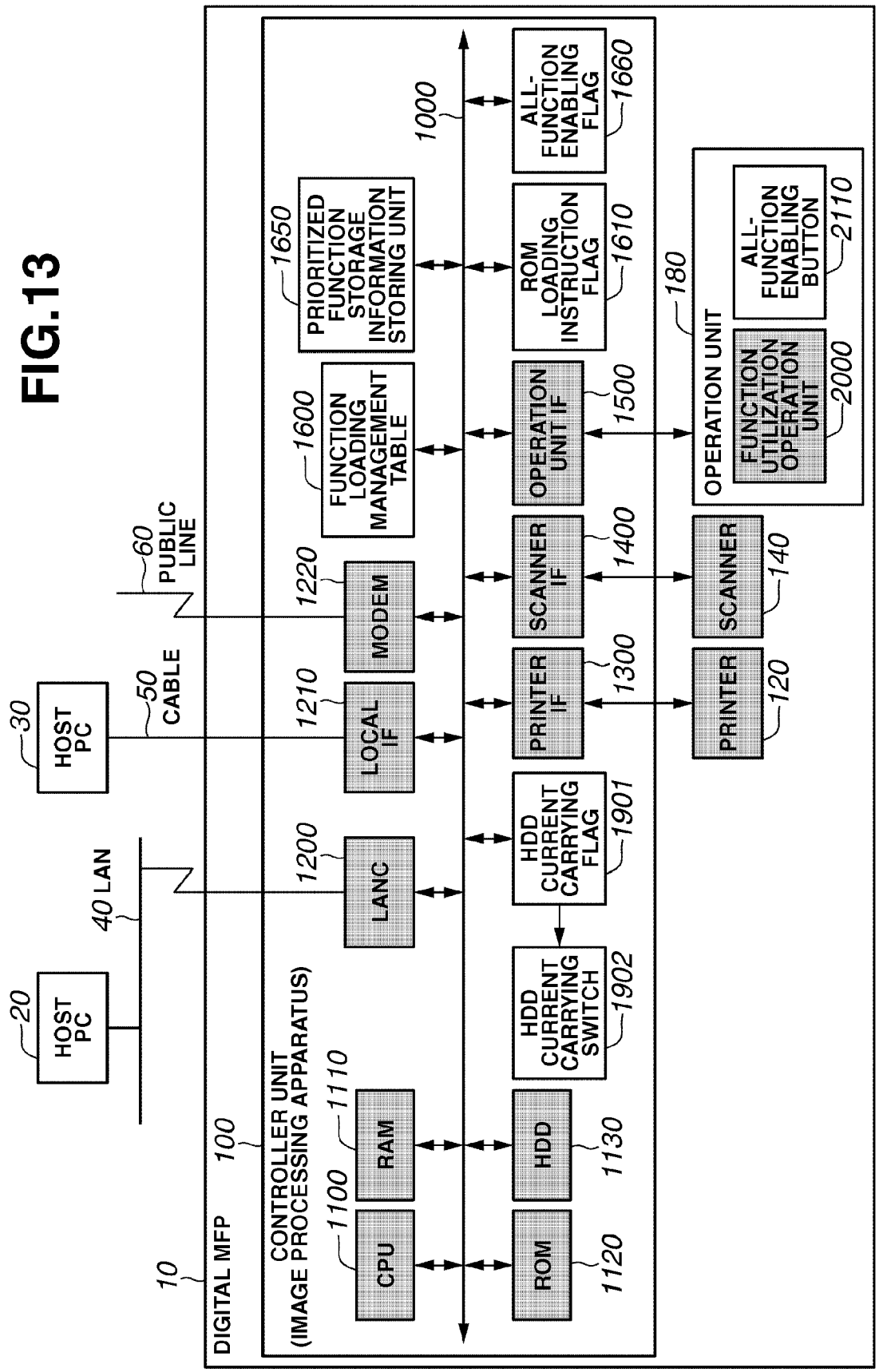
FIG. 13 illustrates a configuration of a data processing apparatus according to a second exemplary embodiment of the present invention.

FIG. 13 illustrates a configuration of a data processing apparatus according to a second exemplary embodiment of the present invention. The elements/units in FIG. 13 that are similar to those illustrated in FIG. 2 have the same numerals and symbols as those in FIG. 2.

Referring to FIG. 13, the operation unit 180 includes the function utilization operation unit 2000 and an all-function enabling button 2110. The function utilization operation unit 2000 includes an input unit such as numeral keys, a copy start button and a display unit such as an LCD display device.

By pressing the all-function enabling button 2110, a user can cause the CPU 1100 to set an all-function enabling flag 1660 to "true". The all-function enabling button 2110 is used to instruct supply of power to the HDD 1130 on the operation unit 180.

The prioritized function storage information storing unit 1650 is used for specifying a function to be activated on a priority basis when the digital MFP 10 is powered on next time and for maintaining information for storing a program of the specified function in the ROM 1120. In the ROM 1120, system software is stored which implements a function to be enabled on a priority basis. However, the system software stored in the ROM 1120 is not fixed, and can be rewritten. Accordingly, the name of the function implemented by the program to be stored in the ROM 1120 is stored in the prioritized function storage information storing unit 1650.

The all-function enabling flag 1660 indicates enabling of functions other than the prioritized function. When the power is on, the all-function enabling flag 1660 indicates "false". When the all-function enabling flag 1660 is set to "true", the processing for controlling a power supply to the HDD 1130 is performed.

Figure 14:
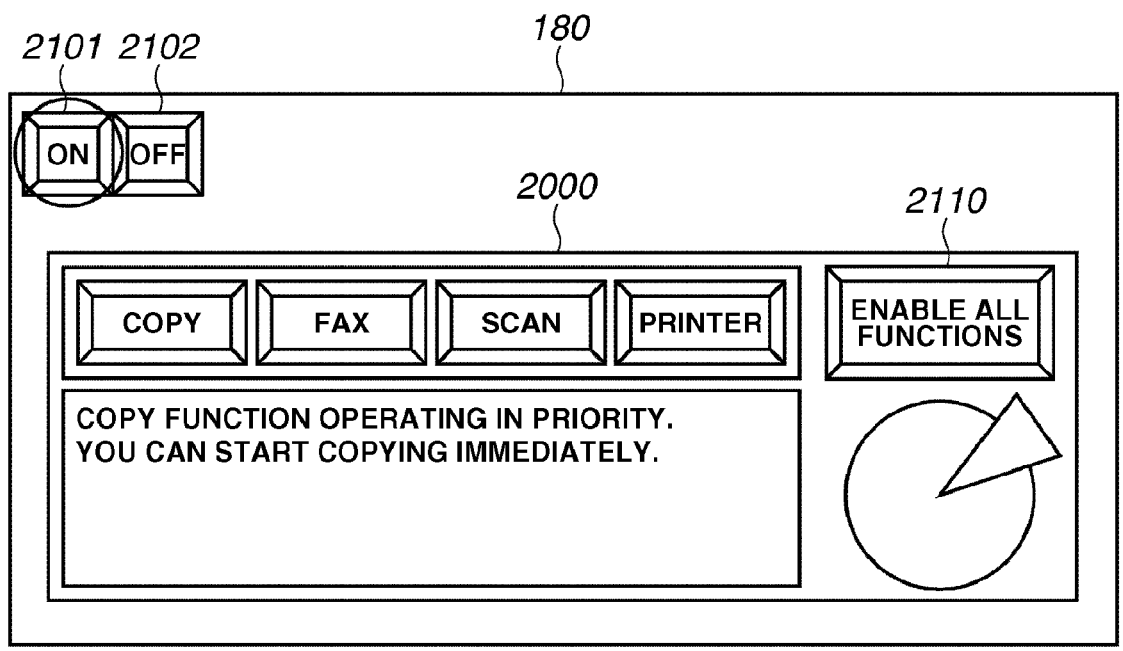
FIG. 14 illustrates an operation screen displayed on a function utilization operation portion of an operation unit illustrated in FIG. 13 according to the second exemplary embodiment of the present invention.
Figure 15:
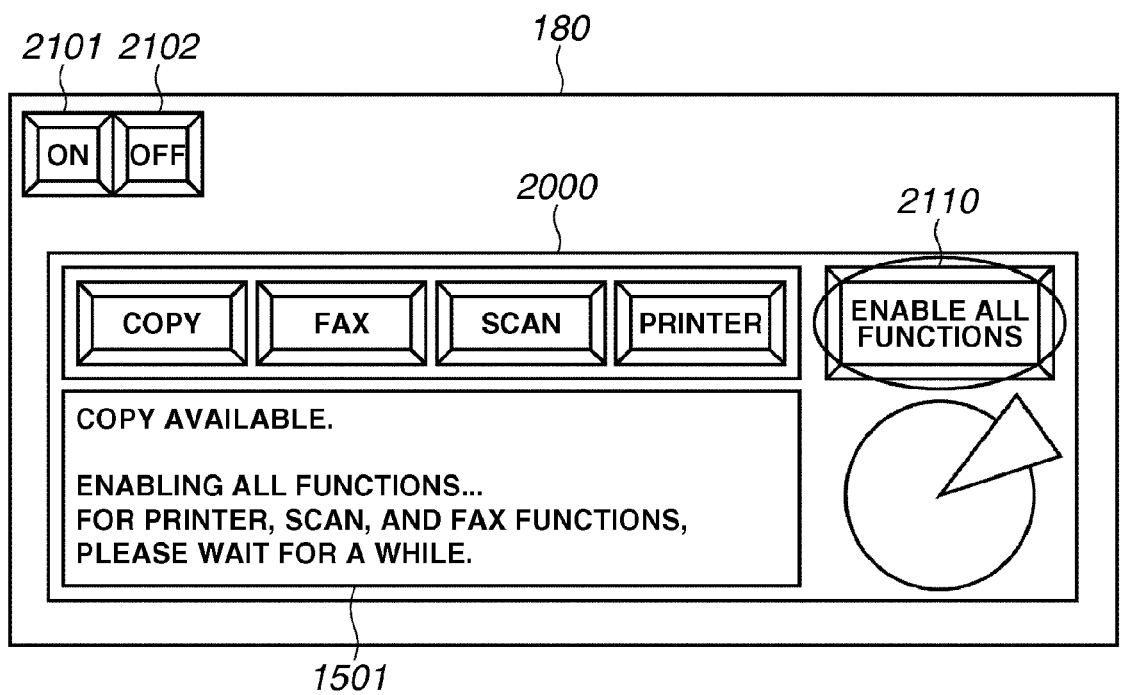
FIG. 15 illustrates an operation screen displayed on a function utilization operation portion of an operation unit illustrated in FIG. 13 according to the second exemplary embodiment of the present invention.

FIG. 14 and FIG. 15 respectively illustrate examples of an operation screen displayed on the function utilization operation unit 2000 of the operation unit 180 illustrated in FIG. 13. Referring to FIG. 14 and FIG. 15, the function utilization operation unit 2000 includes the power-on switch 2101, the power-off switch 2102, and the all-function enabling button 2110.

As described above, the function utilization operation unit 2000 includes an input unit such as numeral keys, a copy start button and a display unit such as an LCD display device. By operating the function utilization operation unit 2000, a user switches to a function that the user desires to utilize, generates an instruction for activating an operation, and displays a state of the digital MFP 10.

An example of a display by the operation unit 180 is shown in FIG. 14 in a case where the copy program is stored in the prioritized program storage unit 3001 of the ROM 1120 according to the example of storing a program illustrated in FIG. 3.

The memory configuration illustrated in FIG. 3 corresponds to a user having pressed the power-on switch 2101 to activate the copy function on a priority basis. At this time, power is not supplied to the HDD 1130.

When the user utilizes only the copy function and discontinues the utilization of the digital MFP 10, the user presses the power-off switch 2102. When the digital MFP 10 is powered off, the power supply to the entire digital MFP 10 is shut off. That is, power is not supplied to the HDD 1130 at all.

An operation performed when the user utilizes all the functions other than the prioritized function, namely, all the functions stored in the HDD 1130, is described below.

The operation display screen illustrated in FIG. 15 is an example of a screen displayed in the operation unit 180 at the time of enabling all the functions. As illustrated in FIG. 15, when the functions other than the prioritized function are utilized, the user presses the all-function enabling button 2110. Then, the CPU 1100 displays a message indicating that all the functions are enabled in a message portion 1501 of the display unit. Then, the CPU 1100 supplies power to the HDD 1130 via the HDD current carrying switch 1902 and loads the programs for functions other than the prioritized function, from the HDD 1130 to the RAM 1110. A series of loading processing is described in detail with reference to the flow chart illustrated in FIG. 16.

Figure 16:
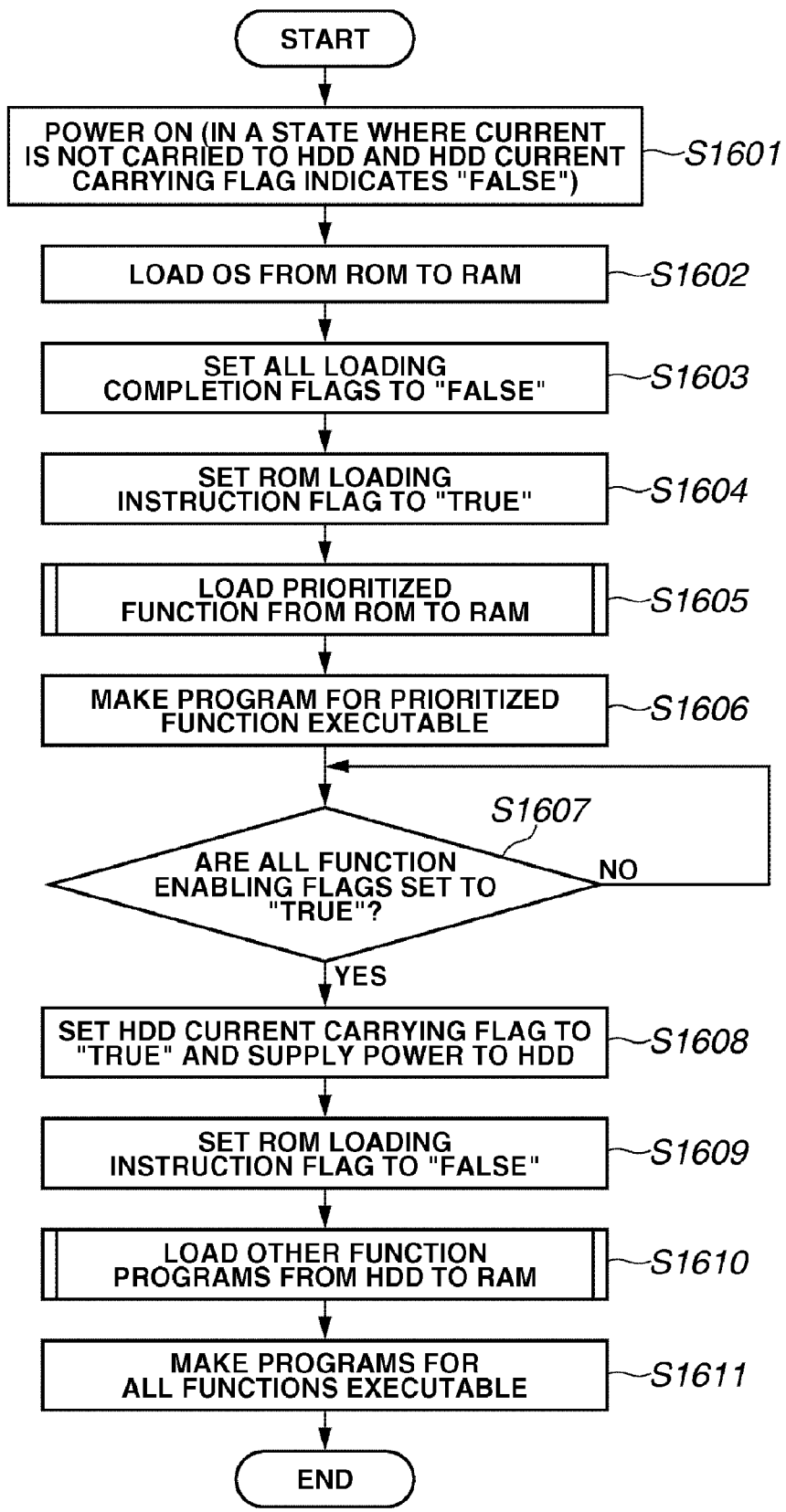
FIG. 16 illustrates processing of data performed by the data processing apparatus according to the second exemplary embodiment of the present invention.

FIG. 16 illustrates an example of data processing performed by the data processing apparatus according to the second embodiment. Briefly, the CPU 1100 detects pressing of the all-function enabling button 2110, and performs switching between loading all the programs of the functions into the RAM 1110 and loading the program for the specified function from the ROM 1120, according to the state of the function loading management table 1600. More specifically, when the user powers on the digital MFP 10, the CPU 1100 loads from the ROM 1120 the program for the specified function according to the state of the function loading management table 1600 and enables the loaded program.

When the user presses the all-function enabling button 2110 in the operation unit 180, power is supplied to the HDD 1130 for the first time. At this time, the CPU 1100 loads and enables the programs of the remaining functions to make all the functions operational.

Turning to FIG. 16, in step S1601, the user presses the power-on switch 2101 of the operation unit 180 to turn on the digital MFP 10. In step S1601, as an initial state, the HDD current carrying flag 1901 is set to "false". Accordingly, the HDD current carrying switch 1902 is off and power is not supplied to the HDD 1130. That is, the state is maintained in which the HDD 1130 is not subjected to power loading, and wear and tear of a rotational shaft due to rotational driving does not occur.

Next, in step S1602, the OS 3000 stored in the ROM 1120 is loaded into the RAM 1110. Then, in step S1603, the CPU 1100 sets all the load completion flags 1604 in the function loading management table 1600 to "false". Flow then proceeds to step S1604, where the CPU 1100 sets the ROM loading instruction flag 1610 to "true".

In step S1605, the CPU 1100 loads the program for the prioritized function stored in the ROM 1120 into the RAM 1110. The processing of performed in step S1605 is similar to the processing illustrated in FIG. 7. In step S1606, the CPU 1100 executes the program that is already loaded into the RAM 1110. By performing the processing in step S1606, the specific function specified in the function loading management table 1600 is enabled.

In step S1607, the CPU 1100 determines whether the all-function enabling flag 1660 is set to "true". If it is determined that the all-function enabling flag 1660 is set to "true", the processing advances to step S1608. If it is determined that the all-function enabling flag 1660 is not set to "true", the processing repeats the processing in step S1607. Note that when the all-function enabling flag 1660 is set to "true", it means that the user has pressed the all-function enabling button 2110 on the operation unit 180. Thus, the CPU 1100 repeats the processing in step S1607 until the all-function enabling flag 1660 is set to "true" and performs polling as to the state of the all-function enabling flag 1660. As illustrated in FIG. 15, when the user presses the all-function enabling button 2110, the all-function enabling flag 1660 is set to "true".

In step S1608, the CPU 1100 sets the HDD current carrying flag 1901 to "true" and turns on the HDD current carrying switch 1902. Thus, power is supplied to the HDD 1130 from a power supply unit (not shown). In step S1609, the CPU 1100 sets the ROM loading instruction flag 1610 to "false". Then, in step S1610, the CPU 1100 loads into the RAM 1110 the programs that are yet to be loaded into the RAM 1110 from among the programs stored in the HDD 1130. The processing performed in step S1610 is similar to the processing illustrated in FIG. 7. In step S1611, the CPU 1100 enables all the functions loaded into the RAM 1110, and then the processing ends.

Hereinbelow, a program deployed into the RAM 1110 according to the present embodiment is described with reference to FIG. 8A through FIG. 8C.

FIG. 8A illustrates a state after the digital MFP 10 is powered on and before each program stored in the ROM 1120 and the HDD 1130 is loaded into the RAM 1110. This state corresponds to the state in which the processing is performed up to step S1604 in the flow chart illustrated in FIG. 16. More specifically, in FIG. 8A, in the function loading management table 1600, the prioritized function flag 1603 for the copy function is set to "true" so that the copy function whose management number 1601 is "0", is previously prioritized. In this state, no program of a function is loaded into the RAM 1110.

FIG. 8B illustrates a state in which the power-on switch 2101 in the operation unit 180 is pressed, an OS and the copy program are loaded from the ROM 1120 to the RAM 1110, and thus the program for a prioritized function is enabled. This state corresponds to the state illustrated in the flow chart in FIG. 16 in which the processing is performed up to step S1606. In this state, the copy program is already deployed in the RAM 1110 (i.e., a main memory). Accordingly, the copy function can be executed although the other functions cannot be used.

In FIG. 8B, the load completion flag 1604 for the copy function in the function loading management table 1600 is set to "true" to indicate that the copy program is already loaded. In this state, the copy program is already deployed in the RAM 1110 (i.e., a main memory). Accordingly, the copy function can be executed although the other functions cannot be used. In addition, power is not supplied to the HDD 1130. Accordingly, when the digital MFP 10 is powered off in this state, the digital MFP 10 is utilized while power is not supplied to the HDD 1130. Accordingly, a life of the HDD 1130 is not affected. In FIG. 8B, the load completion flag 1604 for the copy function in the function loading management table 1600 is set to "true" to indicate that the copy program is already loaded.

FIG. 8C illustrates a state in which the programs for all the functions that the digital MFP 10 has are downloaded from the HDD 1130 into the RAM 1110. This state corresponds to the state illustrated in the flow chart in FIG. 16 in which the processing is performed up to step S1611. In this state, all the functions that the digital MFP 10 has can be executed. The digital MFP 10 shifts to this state after the all-function enabling flag 1660 is set to "true". In FIG. 8C, all the load completion flags 1604 in the function loading management table 1600 are set to "true" to indicate that the programs for all the functions are already loaded.

In the present embodiment, as described above, when the user presses the all-function enabling button 2110 provided to the operation unit 180, power is supplied to the HDD 1130. It is possible, however, that the all-function enabling button 2110 is not provided and power is supplied to the HDD 1130 by operating an ordinary function selection switch.

According to the present embodiment, the time required for enabling a specific function of the digital MFP 10 can be shortened. Accordingly, the function that the user desires to execute can be operational sooner after powering-on of the digital MFP 10. Thus, improving the user's convenience in using the MFP 10.

In addition, the HDD 1130 is activated when a request for accessing to the HDD 1130 is issued during execution of the specific function, where the request serves as a trigger Then, the programs for the remaining functions are automatically loaded, and all the functions become available.

Furthermore, the number of times the HDD 1130 is powered on and off can be reduced, and the time of supplying power to the HDD 1130 can be shortened. Accordingly, the life of the HDD 1130 can be lengthened, and a user can more frequently shift to a power saving mode. Thus, an effect of power saving can be enhanced.

Third Exemplary Embodiment

Figure 17:
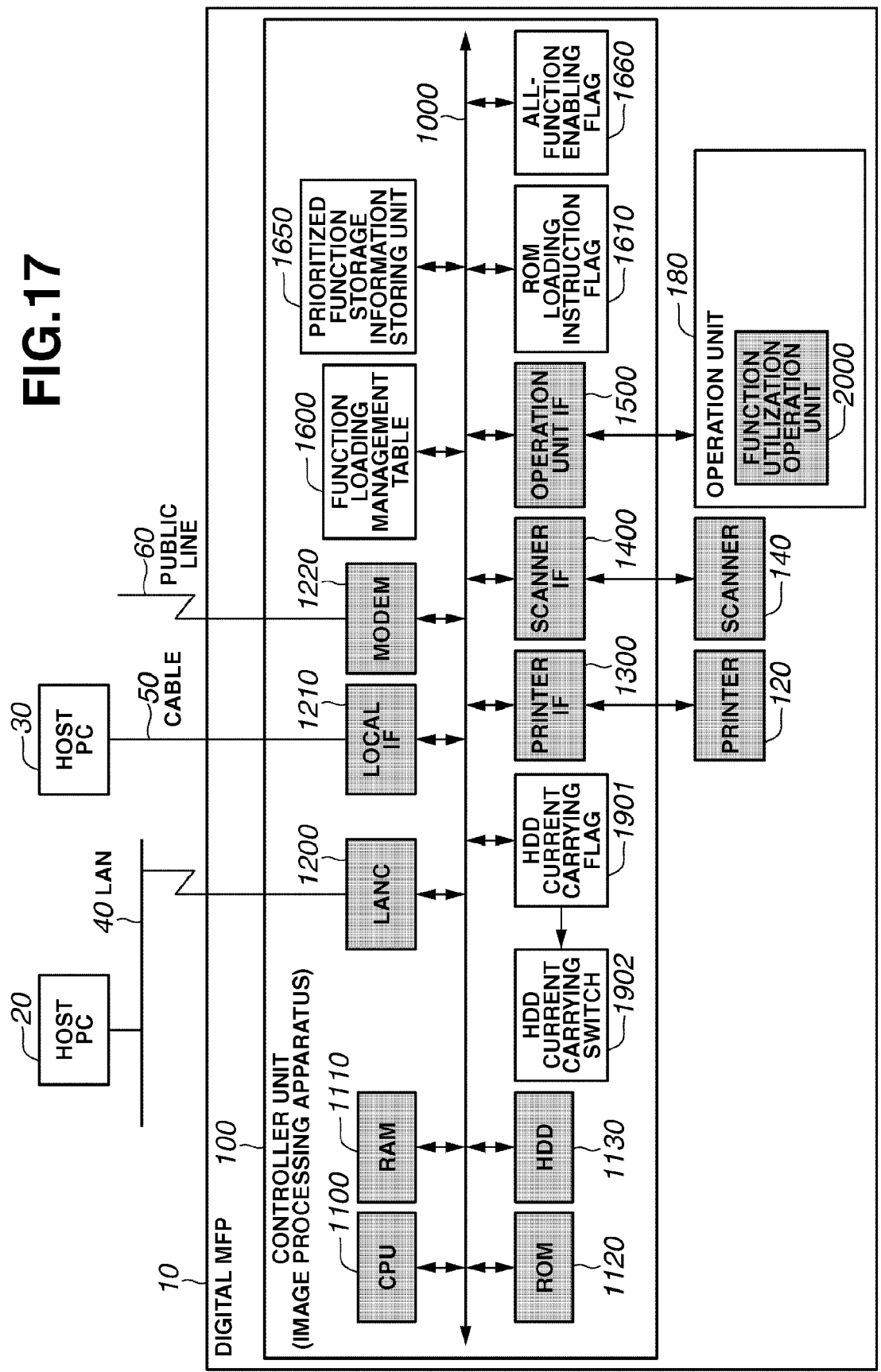
FIG. 17 illustrates a configuration of an image processing system to which the data processing apparatus according to a third exemplary embodiment of the present invention can be applied.

FIG. 17 illustrates an exemplary configuration of an image processing system to which the data processing apparatus according to a third exemplary embodiment of the present invention can be applied. The elements/units in FIG. 17 that are similar to those illustrated in FIG. 13 have the same numerals and symbols as those in FIG. 13 In the present embodiment, an operation is described in which the user utilizes the functions other than the prioritized function, namely, the functions stored in the HDD 1130. More specifically, for example purposes, the present embodiment describes a case where the copy function is enabled on a priority basis, and the user presses a function selection switch for the function that the user desires to directly utilize (i.e., the scan function).

FIG. 17 is different from FIG. 13 in that the operation unit 180 does not include the all-function enabling button 2110. Instead, in FIG. 17, when the user presses any of function selection switches in the function utilization operation unit 2000, the all-function enabling flag 1660 is set to "true". More specifically, a program for a function is loaded from the ROM 1120 and a flag that stores a state of instruction given from ordinary function selection switches S1 through S4 (see FIG. 18), is set to "false". The function selection switches S1 through S4 are provided in the operation unit 180. When a function selection switch corresponding to unloaded programs is pressed, the CPU 1100 loads all the unloaded programs from the HDD 1130 to the RAM 1110.

Figure 18:
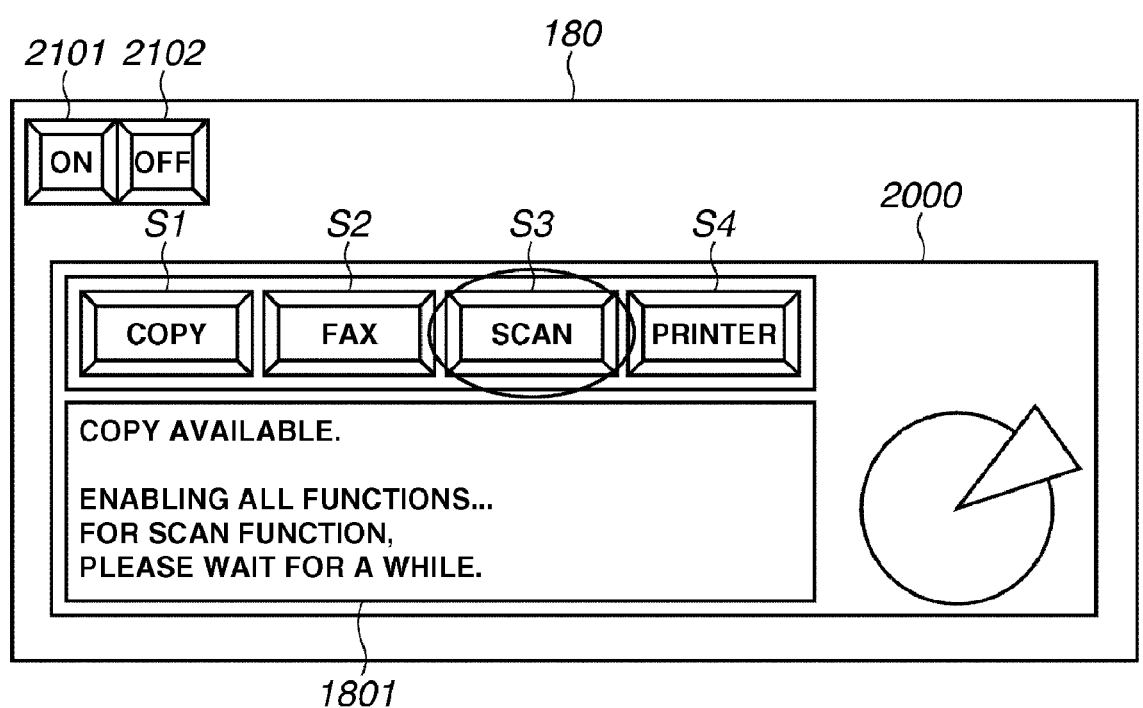
FIG. 18 illustrates an operation screen displayed in an operation unit illustrated in FIG. 17 according to the third exemplary embodiment of the present invention.

FIG. 18 illustrates an example of an operation screen displayed in the operation unit 180. Referring to FIG. 18, functions switches S1 through S4 are displayed in a liquid crystal display unit. In the present embodiment, the copy function is loaded from the ROM 1120 to the RAM 1110 at the time of powering-on of the digital MFP 10. In this state, the user presses the function selection switch other than the copy function, for example, the function selection switch S3, in order to execute a scan function.

Thus, a message 1801, such as "Copy available. Enabling all functions . . . . For scan function, please wait for a while." is displayed.

In parallel to displaying such a message, the CPU 1100 supplies power to the HDD 1130, and loads the program for the function other than the prioritized function from the HDD 1130 to the RAM 1110.

Figure 19:
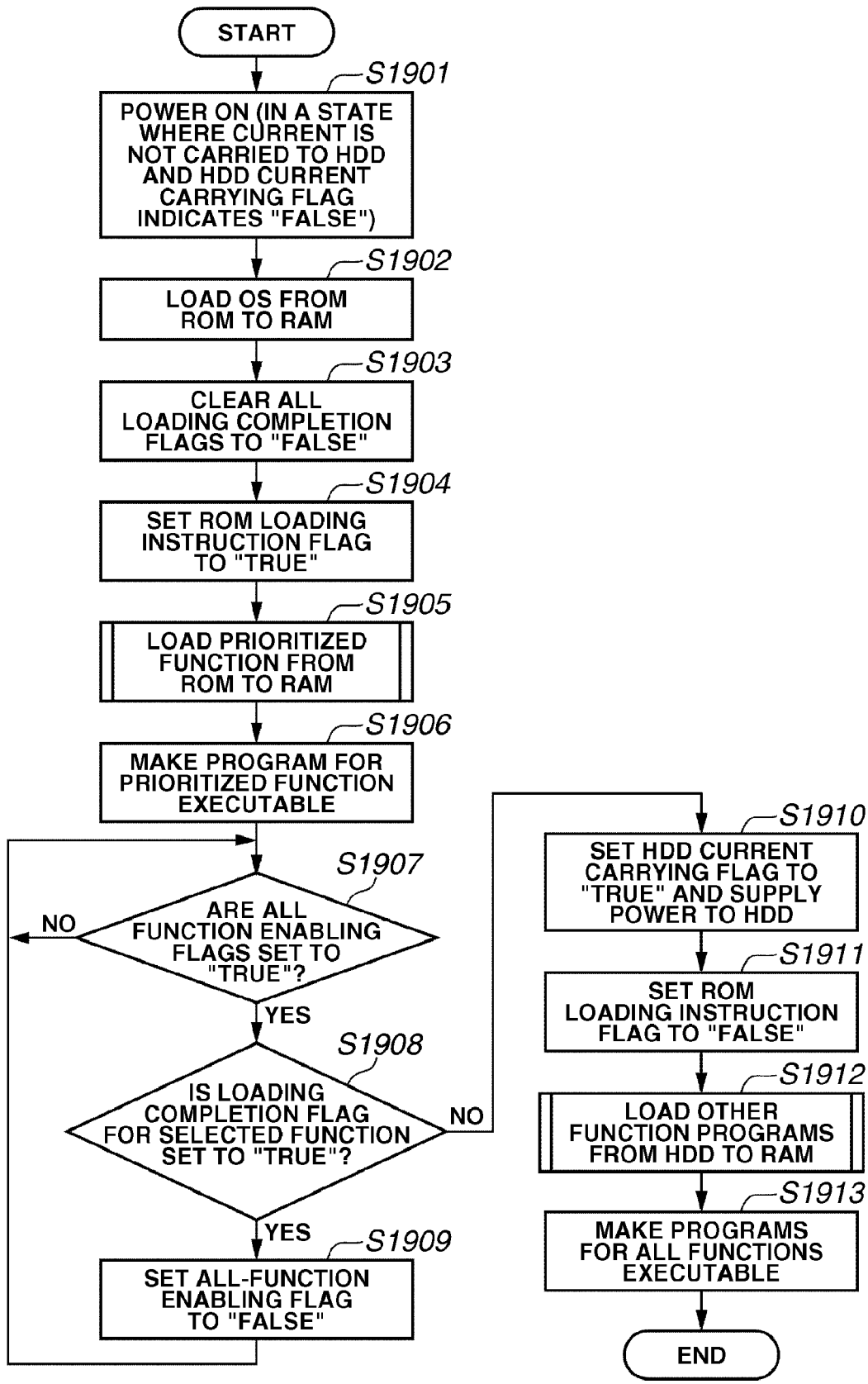
FIG. 19 is a flow chart illustrating data processing performed by the data processing apparatus according to the third exemplary embodiment of the present invention.

FIG. 19 is a flow chart illustrating an example of data processing performed by the data processing apparatus according to the present embodiment. More specifically, when the user powers on the digital MFP 10, the CPU 1100 loads from the ROM 1120 the program for the specified function according to the function loading management table 1600 and enables the loaded program. After that, when the user presses one of the function selection switches S1 through S4, which correspond to the functions other than the specific function, power is supplied to the HDD 1130 for the first time. Then, the CPU 1100 loads all the unloaded programs from the HDD 1130 to the RAM 1110. Thus, the CPU 1100 enables all the functions of the digital MFP 10.

First, in step S1901, the user presses the power-on switch 2101 of the operation unit 180 to turn on the digital MFP 10. In step S1901, as an initial state, the HDD current carrying flag 1901 is set to "false". Accordingly, the HDD current carrying switch 1902 is off and power is not supplied to the HDD 1130.

Next, in step S1902, the OS 3000 stored in the ROM 1120 is loaded into the RAM 1110. The flow then proceeds to step S1903, where the CPU 1100 sets all the load completion flags 1904 in the function loading management table 1600 to "false". In step S1904, the CPU 1100 sets the ROM loading instruction flag 1910 to "true".

In step S1905, the CPU 1100 loads the program for the prioritized function stored in the ROM 1120 into the RAM 1110. The processing performed in step S1905 is similar to the processing described in the first exemplary embodiment. In step S1906, the CPU 1100 executes the program that is already loaded into the RAM 1110. By performing the processing in step S1906, the specific function specified in the function loading management table 1600 is enabled.

In step S1907, the CPU 1100 determines whether the all-function enabling flag 1660 is set to "true". If it is determined that the all-function enabling flag 1660 is set to "true", the processing advances to step S1908. If it is determined that the all-function enabling flag 1660 is not set to "true", the processing repeats the processing in step S1907. The CPU 1100 repeats the processing in step S1607 until the all-function enabling flag 1660 is set to "true" and performs polling as to the state of the all-function enabling flag 1660.

In this state, as illustrated in FIG. 18, the user presses the function selection switch S3. Thus, the CPU 1100 sets the all-function enabling flag 1660 to "true", and accordingly, it is determined in step S1907 that the all-function enabling flag 1660 is set to "true". Then, the processing advances to step S1908.

In step S1908, the CPU 1100 refers to a state of the function loading management table 1600 to determine whether the load completion flag 1604 for the function selected in step S1906 is set to "true". If the program for the copy function is already loaded from the ROM 1120 to the RAM 1110, it is not necessary to load a new program into the RAM 1110. In this case, the processing advances to step S1909. In other cases, the processing advances to step S1910.

In step S1909, the CPU 1100 sets the all-function enabling flag 1660 to "false". Then, the processing returns to step S1907. In step S1910, the CPU 1100 sets the HDD current carrying flag 1901 to "true" and turns on the HDD current carrying switch 1902. Thus, power is supplied from a power supply unit (not shown) to the HDD 1130.

In step S1911, the CPU 1100 sets the ROM loading instruction flag 1610 to "false". In step S1912, the CPU 1100 loads into the RAM 1110 the programs that are yet to be loaded into the RAM 1110 from among the programs stored in the HDD 1130. The processing performed in step S1912 is similar to the processing described in the first exemplary embodiment. In step S1913, the CPU 1100 enables all the functions loaded into the RAM 1110, that is, the CPU 1100 sets all the load completion flags 1604 in the function loading management table 1600 to "true", and then the processing ends.

Fourth Exemplary Embodiment

In the above described exemplary embodiments, all the unloaded programs for the functions are loaded from the HDD 1130 into the RAM 1110 when the CPU 1100 detects the pressing of any of the function selection switches S2 through S4. However, depending on a user's working environment, available space in the RAM 1110 can dynamically vary. Accordingly, among the other functions, only functions selected by the user are loaded into the RAM 1110 when the program loaded on a priority basis into the RAM 1110 as a specific function and an amount of usage of the RAM 1110 are considered.

Other Exemplary Embodiments

The configuration of a data processing program that can be read by a data processing system according to any of the above described exemplary embodiments is depicted with reference to a memory map illustrated in FIG. 20. More specifically, FIG. 20 illustrates a memory map of a storage medium that stores various data processing programs that can be read by a data processing apparatus according to any of the above described exemplary embodiments of the present invention.

Although not illustrated in FIG. 20, information for managing the programs stored in the storage medium, such as version information and information concerning the creator of a program, can be stored in the storage medium. In addition, information dependent on an operating system (OS) of an apparatus that reads the program, such as an icon for identifying and displaying the program, can be stored in the storage medium.

In addition, data that is applicable to the various programs is also managed in a directory of the storage medium. Further, a program for installing the various programs on a computer can be stored in the storage medium. In the case where a program to be installed is compressed, a program for decompressing the compressed program can also be stored in the storage medium.

Furthermore, the functions according to the above described exemplary embodiments can be implemented by a host computer using a program that is externally installed. In this case, the present invention can be applied to the case where a group of information including a program is supplied to an output device from a storage medium such as a CD-ROM, a flash memory, and a floppy disk (FD) or from an external storage medium through a network.

The present invention can also be achieved by providing a system or an apparatus with a storage medium storing program code of software implementing the functions of the embodiments and by reading and executing the program code stored in the storage medium with a computer of the system or the apparatus (a CPU or an MPU). In this case, the program code itself, which is read from the storage medium, implements the functions of the embodiments described above, and accordingly, the storage medium storing the program code constitutes the present invention. The program can be configured in any form, such as object code, a program executable by an interpreter, and script data supplied to an OS.

As the storage medium for supplying such program code, for example, a floppy disk, a hard disk, an optical disk, a magneto-optical disk, an MO, a CD-ROM, a CD-R, a CD-RW, a magnetic tape, a nonvolatile memory card, a ROM, and a DVD can be used. In this case, the program code itself, which is read from the storage medium, implements the function of the embodiments mentioned above, and accordingly, the storage medium storing the program code constitutes the present invention.

The above program can also be supplied by connecting to a web site on the Internet by using a browser of a client computer and by downloading the program from the web site to a storage medium such as a hard disk. In addition, the above program can also be supplied by downloading a compressed file that includes an automatic installation function, from the web site to a storage medium such as a hard disk. The functions of the above embodiments can also be implemented by dividing the program code into a plurality of files and downloading each divided file from different web sites. That is, a WWW server or an FTP server for allowing a plurality of users to download the program file for implementing the functional processing constitutes the present invention.

In addition, the above program can also be supplied by distributing a storage medium such as a CD-ROM and the like which stores the program according to the present invention after an encryption thereof; the user who is qualified for a prescribed condition, can be allowed to download key information for decoding the encryption from the web site via the Internet; The encrypted program code can be executed and installed in the computer using the key information.

Further, the functions according to the embodiments described above can be implemented not only by executing the program code read by the computer, but also implemented by the processing in which an OS (operating system) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

According to an exemplary embodiment of the present invention, during an execution of a program of a specific function that is enabled on a priority basis and stored in a first storage unit, when a request for accessing to a second storage unit is issued, from among a plurality of functions, the programs for the other functions stored in the second storage unit can be loaded into a memory. Accordingly, a life of the second storage unit can be lengthened while the loading processing of the specific function can be immediately executed which is desired by a user on a priority basis.

In addition, the data processing apparatus according to an exemplary embodiment of the present invention is capable of immediately responding to a user's request for executing a specific function and shifting to a state in which the specific function can be executed at an appropriate timing. Thus, the user's convenience can be improved. In addition, the number of times of supplying power to the second storage unit can be reduced and a life of the second storage unit can be increased.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-070564 filed Mar. 15, 2006, which is hereby incorporated by reference herein in its entirety.

What is claimed is:

1. A data processing apparatus configured to load a program corresponding to each of a plurality of functions into a memory and execute the program loaded into the memory, the data processing apparatus comprising:
   an input unit configured to input image data;
   a first storage unit configured to store a program for a specific function;
   a second storage unit configured to store at least one program for a function different from the specific function, wherein the specific function includes a function for storing the input image data into the memory and a function for storing the input data into the second storage unit;
   a processing unit configured to execute the program loaded into the memory;

a determining unit configured to determine whether the input image data is to be stored into the memory or the input image data is to be stored into the second storage unit;

a power supply unit configured to start, for a first time, supplying power to the second storage unit in a case where it is determined that the input image data is to be stored into the second storage unit;

a first loading control unit configured to load the program for the specific function from the first storage unit into the memory in a case where power to the data processing apparatus is turned on;

a second loading control unit configured to load the program for the function different from the specific function from the second storage unit into the memory in a case where it is determined that the input image data is to be stored into the second storage unit and the power supply from the power supply unit to the second storage unit is started during execution of the program for the specific function; and a requesting unit configured to request a function corresponding to a program not loaded into the memory, wherein the power supply unit starts supplying power to the second storage unit in a case:
 when the function corresponding to the program not loaded into the memory is requested; and
when the size of the input image data is too large to be spooled into the memory.

2. The data processing apparatus according to claim 1, wherein the first storage unit is a semiconductor memory that can be accessed at a speed higher than a speed for accessing the second storage unit, and wherein the second storage unit is an external memory that is accessed at a speed lower than the speed for accessing the first storage unit.

3. The data processing apparatus according to claim 2, wherein the external memory is a hard disk.

4. The data processing apparatus according to claim 2, wherein the semiconductor memory is a flash memory.

5. The data processing apparatus according to claim 1, wherein the program stored in the first storage unit can be changed from the program for specific function to the program for the function different from the specific function.

6. The data processing apparatus according to claim 1, further comprising:

a storing unit configured to store identification information for identifying the program to be stored in the first storage unit; and a storage control unit configured to select a program which corresponds to the identification information and is stored in the second storage unit, and to store the selected program in the first storage unit.

7. The data processing apparatus according to claim 1, wherein the input unit inputs the image data by receiving the image data transmitted from an external apparatus.

8. A method for loading programs in a data processing apparatus including a first storage unit configured to store a program for a specific function and a second storage unit configured to store at least one program for a function different from the specific function, the data processing apparatus configured to load a program corresponding to each of a plurality of functions into a memory and execute the program loaded into the memory, the method comprising:

inputting image data;

determining whether the input image data is to be stored into the memory or the input image data is to be stored into the second storage unit, wherein the specific function includes a function for storing the input image data into the memory and a function for storing the input image data into the second storage unit;

starting, for a first time, supplying power to the second storage unit in a case where it is determined that the input image data is to be stored into the second storage unit;

loading the program for the specific function from the first storage unit into the memory in a case where power to the data processing apparatus is turned on;

loading the program for the function different from the specific function from the second storage unit into the memory in a case where it is determined that the input image data is to be stored into the second storage unit and the power supply to the second storage unit is started during execution of the program for the specific function;

executing the program loaded into the memory; and requesting a function corresponding to a program not loaded into the memory, wherein supplying power to the second storage unit starts in a case;
 when the function corresponding to the program not loaded into the memory is requested; and
 when the size of the input image data is too large to be spooled into the memory.

9. The method according to claim 8, wherein the first storage unit is a semiconductor memory that can be accessed at a speed higher than a speed for accessing the second storage unit, and wherein the second storage unit is an external memory that is accessed at a speed lower than the speed for accessing to the first storage unit.

10. The method according to claim 9, wherein the external memory is a hard disk.

11. The method according to claim 9, wherein the semiconductor memory is a flash memory.

12. The method according to claim 8, wherein the program stored in the first storage unit can be changed.

13. The method according to claim 8, further comprising:

storing identification information for identifying the program to be stored in the first storage unit; and selecting a program which corresponds to the identification information and is stored in the second storage unit and storing the selected program in the first storage unit.

14. The method according to claim 8, wherein the image data is input by receiving the image data transmitted from an external apparatus.

15. A computer-readable storage medium containing computer-executable instructions for controlling a data processing apparatus including a first storage unit configured to store a program for a specific function and a second storage unit configured to store at least one program for a function different from the specific function, the data processing apparatus configured to load a program corresponding to each of a plurality of functions into a memory and execute the program loaded into the memory, the medium comprising:

computer-executable instructions for inputting, via an input unit, image data;

computer-executable instructions for determining, via a determining unit, whether the input image data is to be stored into the memory or the input image data is to be stored into the second storage unit, wherein the specific function includes a function for storing the input image data into the memory and a function for storing the input image data into the second storage unit;

computer-executable instructions for starting, for a first time, supplying power, via a power supply unit, to the second storage unit in a case where it is determined that the input image data is to be stored into the second storage unit;

computer-executable instructions for loading, via a first loading control unit, the program for the specific function from the first storage unit into the memory in a case where power to the data processing apparatus is turned on;

computer-executable instructions for loading, via a second loading control unit, the program for the function different from the specific function from the second storage unit into the memory in a case where it is determined that the input image data is to be stored into the second storage unit and the power supply to the second storage unit is started during execution of the program for the specific function, and executing the program loaded into the memory; and computer-executable instructions for requesting a function corresponding to a program not loaded into the memory, wherein supplying power to the second storage unit starts in a case;

when the function corresponding to the program not loaded into the memory is requested; and when the size of the input image data is too large to be spooled into the memory.

* * * * *